April 23, 1957  G. C. TOOTILL ET AL  2,789,759
ELECTRONIC DIGITAL COMPUTING MACHINES
Filed June 21, 1950  12 Sheets-Sheet 7

INVENTORS:
G. C. TOOTILL
F. C. WILLIAMS
T. KILBURN
G. E. THOMAS
D. B. G. EDWARDS
By: Stevens, Davis, Miller & Mosher
Attorneys

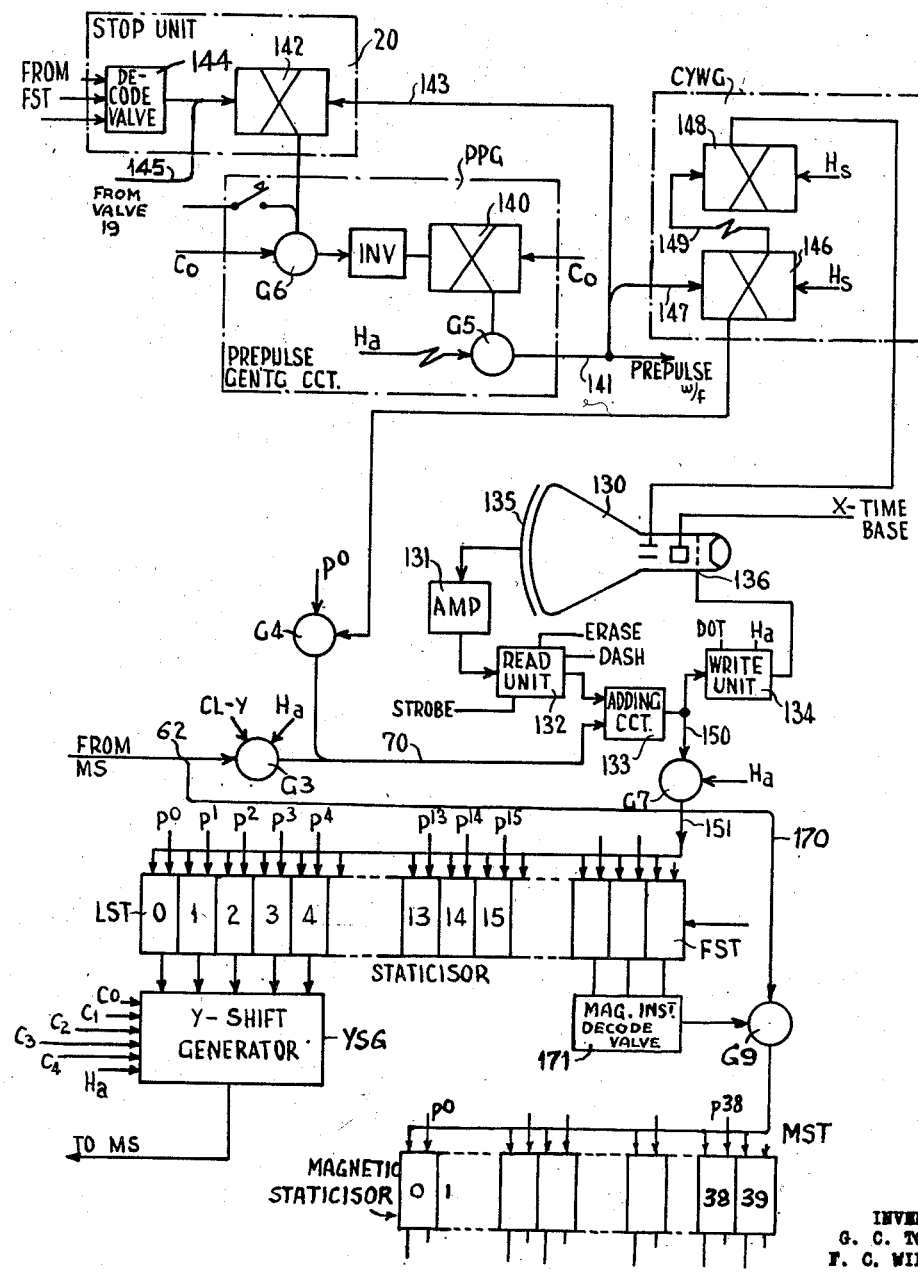

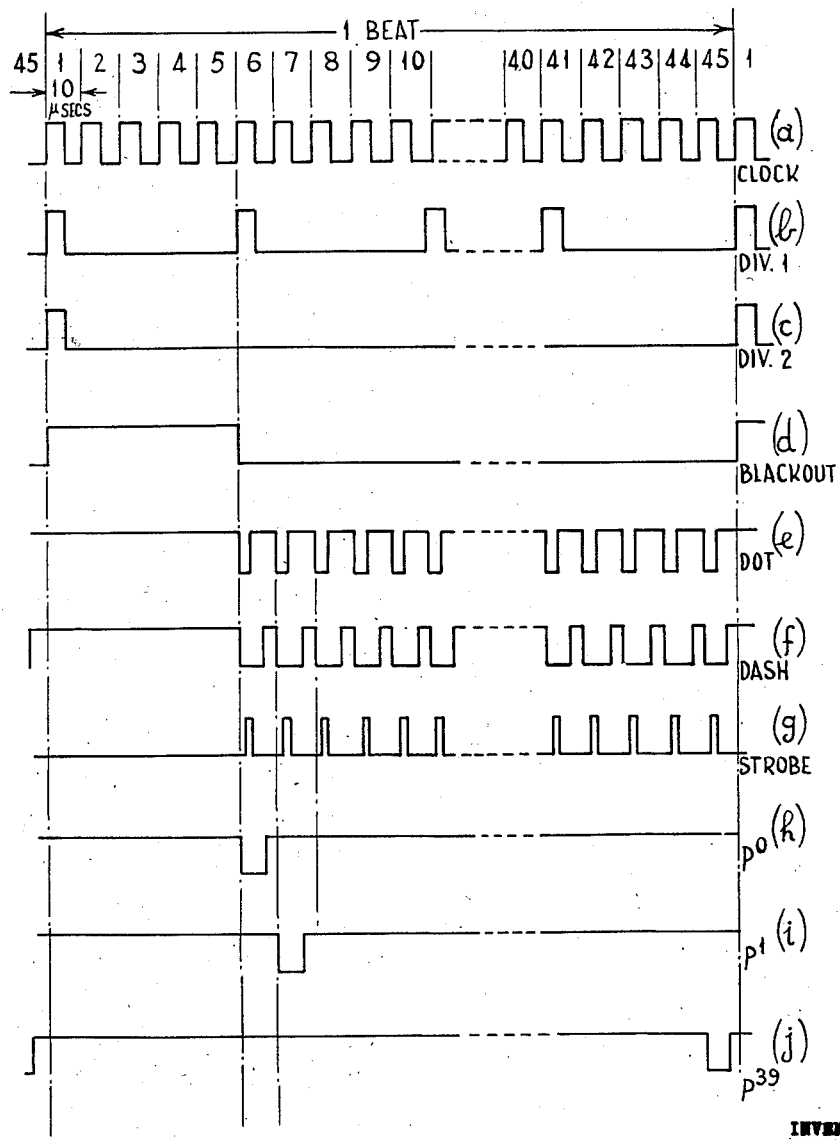

United States Patent Office 2,789,759
Patented Apr. 23, 1957

2,789,759

ELECTRONIC DIGITAL COMPUTING MACHINES

Geoffrey Colin Tootill, Shrivenham, Frederic Calland Williams, Timperley, and Tom Kilburn, Manchester, England, and Gordon Eric Thomas, Port Talbot, and David Beverley George Edwards, Tonteg, near Pontypridd, Wales, assignors to National Research Development Corporation, London, England, a corporation of Great Britain Application June 21, 1950, Serial No. 169,388

Claims priority, application Great Britain June 22, 1949

13 Claims. (Cl. 235—61)

The present invention relates to electronic digital computing machines employing digital storage devices, which may conveniently be a Williams' storage tube as described in a paper by F. C. Williams and T. Kilburn in the Proceedings of the Institute of Electrical Engineers, vol. 96, part III, March 1949, pages 81–100.

In several existing computing machines embodying storage devices of this type there is stored on each of a number of parallel lines which constitute a raster on the screen of a cathode ray tube a "word" or "words," a "word" representing a number or an instruction which controls the transfer of a number from one part of the machine to another, or the combination of a number and an instruction.

The rasters are produced on the screens by the action of an electron beam and "words" are written onto or read out from a line of the raster during certain, so-called "Action" beats or minor cycle periods of the operating rhythm of the machine whereas the words stored on the various lines are periodically regenerated during other, so-called "Scan" beats which usually occur alternately with the aforesaid action beats.

The dynamic signal form of a word is a pulse pattern and in the binary system embodiments described in this specification the presence of a "1" digit will be indicated by the existence of a pulse and the presence of a "0" digit by the absence of such a pulse. Pulses will in general be assumed to be negative-going from a normal datum or resting level. In the particular description reference will be made to a serial mode machine in which the time period between the beginning of two consecutive pulses (called the digit period) is 10 microseconds and the pulse duration is 6 microseconds.

In the aforesaid existing machines words which are required to be immediately available are stored in a cathode ray tube store and other words which are required to be available at some later time during the solution of a problem are stored in a subsidiary store of the rotating magnetic drum type as described later and generally similar in most physical respects to that described by A. A. Cohen et al. in "Technical Monograph 4801"—Engineering Research Associates Inc., May 1, 1948. Arrangements are provided for transferring a block of information comprising a number of words from a given part of the magnetic store to the cathode ray tube store or vice versa as required during the continued operation of the machine.

The present invention particularly relates to methods of checking computations made by a digital computing machine and according to the invention there is provided a method of automatically checking a computation in a digital computing machine which comprises the steps of performing the said computation a first time to obtain a first result, storing said first result in a subsidiary storage system, performing the computation a second time to obtain a second result, comparing said first and second results and terminating the computation if said first and second results are identical but storing said second result and performing the computation a third time to obtain a third result if said first and second results differ, comparing said second and third results and terminating the computation if said second and third results are identical but storing said third result and performing the computation a fourth time if said second and third results differ and so on until two identical results are obtained.

If two or more consecutive solutions to a problem are in agreement then the solutions may reasonably be assumed to be correct. To save time however it is desirable in the case of long computations that the accuracy of operation of the machine should be checked at intermediate stages of the problem. For this reason, it will be appreciated that the said computation may be only part of a much longer computation and in the statement of invention and in the appended claims, the word "computation" shall include this meaning.

According to a feature of the invention, the method set out above is slightly modified by including the steps of comparing the said first result with an arbitrary result (conveniently a series of zeros) already stored in the said subsidiary store. It will be seen from the following particular description that this arrangement leads to a simplified code of instruction for checking a computation.

According to another feature of the invention, the method of computation also includes the step of stopping the machine when the number of non-identical results reaches a predetermined number. This, of course, enables the machine to be inspected for faults which are probably present when a comparatively large number of non-identical results are obtained.

A preferred embodiment of the invention comprises a machine having a high speed storage system comprising Williams' storage tubes and a subsidiary storage system comprising a magnetic store.

In order that the invention may be more clearly understood, one embodiment will now be described with reference to the accompanying drawings in which:

Figures 2, 3 and 4 show detailed circuit arrangements of the checking apparatus shown in Figure 1, while

Fig. 8 is a diagram showing the general arrangement of a control system also embodying a cathode ray storage tube.

Figs. 11, 12, 13 and 14 show various electrical waveforms concerned with the operation of the machine.

Figure 1:
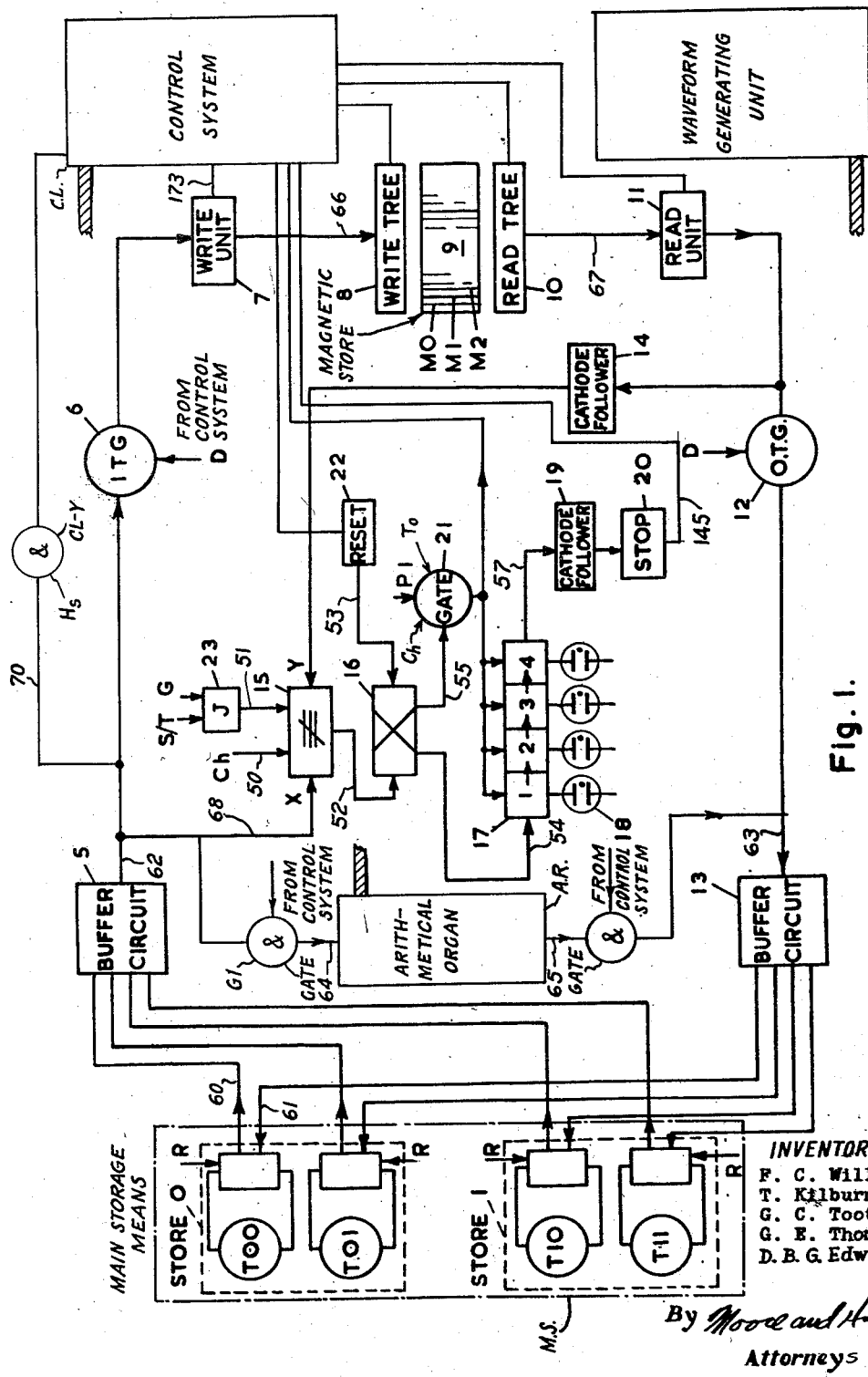
Figure 1 shows in block schematic form checking apparatus according to the invention.

A broad outline of the illustrated embodiment of the invention will first be given with reference to the block schematic diagram of Fig. 1. The machine illustrated in this figure comprises a main data storage means MS consisting of a number of separate store units Store 0, Store 1 . . . each comprising two storage tubes, such as those indicated at T00 and T01 in Store 0, with their ancillary parts as described in greater detail later with reference to Fig. 6. Each tube circuit includes a read output lead, such as that shown at 60, upon which a pulse signal train representing a binary number constituting either a number or an instruction word may be derived from any selected address in the store and a write input lead, such as that shown at 61, upon which a similar pulse signal train may be supplied to write a word into any selected address in such store.

The respective individual read output leads 60 from each of the separate tubes are combined, in non-mutually reactive manner, in a buffer circuit 5 to supply a main read output lead 62 while the respective individual write input leads 61 for each of the tubes are similarly supplied by way of a buffer circuit 13 from a main write input lead 63

The actual arithmetical operation required, such as addition or subtraction, multiplication or division, is performed in an arithmetical organ or accumulator AR which conveniently also includes a cathode ray storage tube and operates with the number-representing pulse signal trains available on lead 62. One example of accumulator device will be described in greater detail later with reference to Fig. 7 of the drawings. Such accumulator has an input lead 64 connected through a gate circuit G1 to the main read output lead 62, and through which numbers, represented by pulse signal trains, may be fed from the main store MS to the accumulator AR for addition to (or subtraction or other arithmetical combination with) the existing content of such accumulator. The existing number content of the accumulator is available on output lead 65 which is connected to the main write input lead 63 through a gate circuit G2 whereby such numbers may be fed back to the main store MS when desired.

Figure 2:
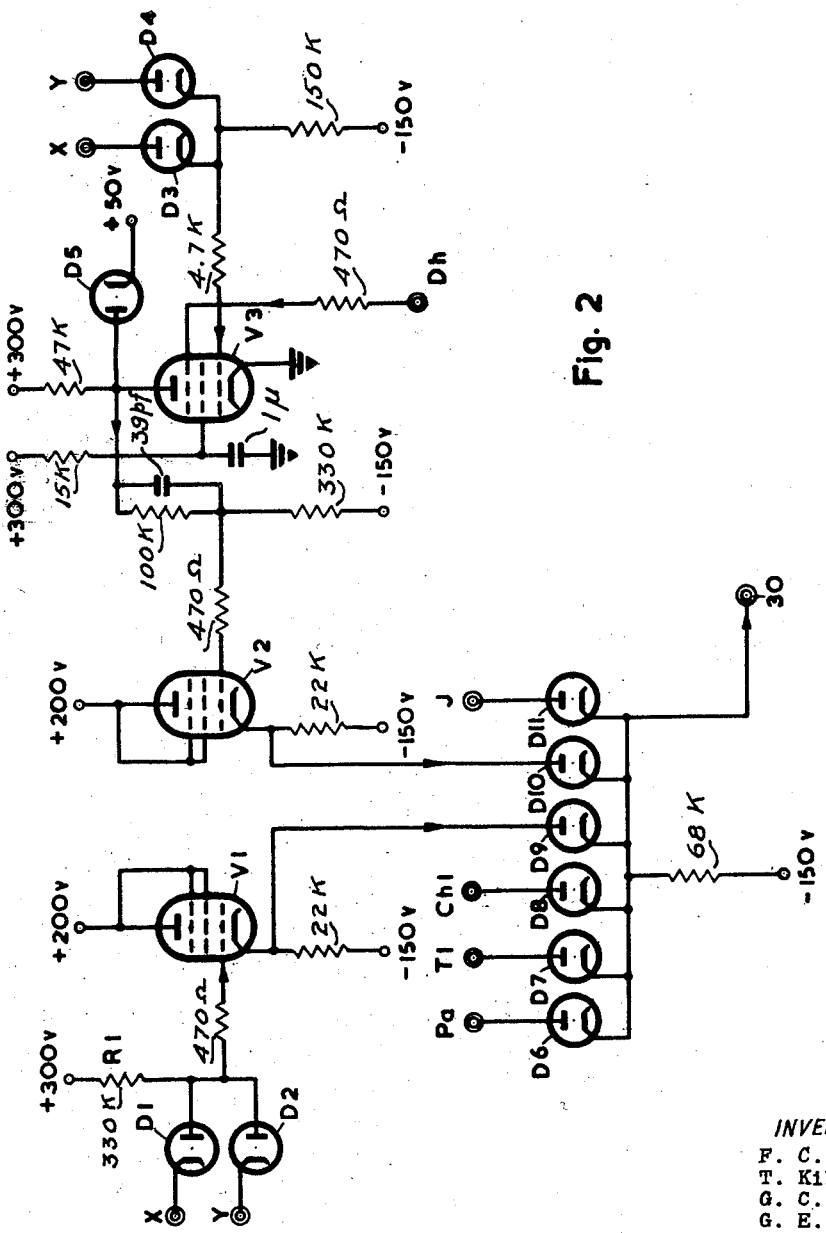

The gate circuits G1, G2 are conveniently of the known multiple diode type as illustrated for example, by diodes D6—D11 of Fig. 2, their controlling potentials, which determine whether they are open to transmit signals therethrough or closed to inhibit such transmission, being provided from a control system CL. This control system, of which an example will be described in greater detail later with reference to Fig. 8, is arranged to be supplied with word signals from the main storage means MS by way of lead 70 which includes a gate circuit G3 and governs the step-by-step operation, at the controlling rhythm of the machine, in the carrying-out of the various sequential orders or instructons which constitute the prepared programme of instructions devised by the operator of the machine. This control system includes means which govern the selection, during each operative cycle or bar covering one of the aforesaid instructions, of an appropriate instruction word from its known storage location in the main storage means MS and the subsequent use, in the same bar, of such selected instruction word to control the various gate and other like circuits which determine the particular signal transfer channels and other parts of the device which are to be operative at that time for the carrying out the desired computation step and also the selection of the particular storage location in the main storage means MS of the number word involved in the computation step. The control system also includes two staticisor devices each consisting of a plurality of separate sections, one for each digit of an instruction word and by which, a static or maintained electric potential representative of the related digit in the transient pulse signal train, is provided. Suitable combinations of these staticised digit signals are used to control the various elements like the gate circuits G1, G2 . . . , and other parts of the machine.

To increase the storage capacity for both number and instruction words within the machine, a subsidiary store of larger word capacity but slower access speed than that of said main storage system MS is provided in the form of a magnetic drum type device 9 whose construction will be referred to in greater detail later with reference to Fig. 9 but which principally comprises a cylindrical metal drum having a magnetic recording layer around its peripheral surface. A plurality of narrow and endless circumferential strip-like regions of this recording surface each from a separate recording track M0, M1, M2 . . . and cooperate with individual electromagnetic recording and reproducing heads through which the various word-representing pluse signal trains can be recorded upon such magnetic surface as a magnetisation pattern and reproduced again later as and when required. Selection of a particular one of the recording heads to be operative upon its associated track is effected through a write tree circuit 8 by means of which signals present upon the input lead 66 are fed to that head only. Similarly, selection of a particular one of the reproducing heads to be operative upon its associated track is effected through a read tree circuit 10 by means of which only those signals reproduced by the chosen head from its track are supplied to the output lead 67. Both tree circuits are controlled from the control system CL in accordance with the particular instruction word which is being obeyed at the time.

Word-representing signals appearing on the main read output lead 62 from the main storage means MS can be applied to the magnetic store input lead 66 by way of a gate circuit 6, known as the Inward Transfer Gate, and a write unit 7 which serves to transform the normal square pulse waveform used for number signalling in the machine into a special form suitable to effect energisation of the selected electromagnetic recording head. Both the gate 6 and the unit 7 are controlled by potentials provided by the control system CL in accordance with the nature of the particular instruction word being obeyed.

In somewhat similar manner output signals appearing from a selected reproducing head through the read tree 10 upon output lead 67 are fed to read unit 11 which operates to convert their form back to the normal square pulse character used in the machine, the reconverted signals being then fed by way of a gate circuit 12, known as the Outward Transfer Gate, to the main input lead 63 to the main storage means MS. The gate 12 and the read unit 11 are controlled by potentials provided by the control system CL, in similar manner to the gate circuit 6 and write unit 7 to be operative only when a particular form of instruction is being obeyed.

For the purpose of checking a number or a series of numbers available in pulse train signal form upon the main output lead 62 from the main storage means MS with a simultaneously occurring number or series of numbers present upon the output lead 67 from the magnetic drum 9 there is provided a non-equivalence circuit 15 which will be described in detail later with reference to Fig. 2. This circuit is supplied by way of a first or X input lead 68 from the output lead 62 and by way of a cathode follower stage 14 and a second or Y input lead 69 from the output lead 67. This non-equivalence circuit 15 is operative only when supplied with certain special controlling waveforms whose derivation will be described in detail later and which comprise a Ch digit waveform over lead 50 and a J waveform over lead 51, the latter being provided by the J-waveform generator circuit 23 which is operated, as described later, by further waveforms known as the S/T digit and G digit waveforms. The Ch, S/T and G waveforms are all provided from the control system CL.

When operative, the non-equivalence circuit 15 provides an output pulse on lead 52 whenever two simultaneous digits of the X and Y input signal trains are not equal, i. e. whenever one is a "0" signal and the other is a "1" signal. This output on lead 52 is applied as a triggering input to a two-stable state trigger circuit 16 which is also supplied over lead 53 with resetting pulses from a reset unit 22 at times determined by the control system CL. The trigger circuit 16, when triggered by a pulse from the non-equivalence circuit 15, provides an output potential on lead 54 which operates to advance, by one step, the count condition of a four stage binary counter chain 17 each stage of which controls the excitation of a glow discharge tube 18 for providing a visual indication of the count condition. When in its untriggered or reset condition the trigger circuit 16 provides a control potential by way of lead 55 for a gate circuit 21 whereby such gate is opened during check operation conditions to allow the passage of a timed signal pulse, known at the $p^1$ pulse and described later, to the control system CL over lead 56 and to the reset input terminals of each of the counter chain stages 17. This $p^1$ pulse, which is available only when the trigger circuit 16 has not been triggered during the immediately preceding comparison of the X and Y input signals to circuit 15, causes a change of selection order of the next instruction word by the control system CL whereby the machine proceeds to the next computation step and at the same time resets the counting chain 17 back to zero if it has been advanced previously. If, on the other hand, the trigger circuit 16 is triggered due to a non-equivalence in the X and Y signals, the gate 21 remains closed and the control system CL proceeds to carry out a repeat of the previous computation step followed by a repetition of the checking operation the new X signal being the result of the repeated computation and the new Y signal being a stored version of the previous X signal. Only when equivalence is established between two consecutive results does the compution proceed.

The final stage of the counter chain, when reversed back to its initial condition upon arrival of the sixteenth consecutive pulse over lead 54, indicating sixteen repeated failures to find equivalence with a preceding result, provides an output potential on lead 57 which is fed by way of a cathode follower stage 19 to a stop unit 20 which is interconnected with the control system CL and when operated serves to arrest the computation operations within the machine and, if desired, provide a suitable alarm signal indicating machine failure. The form of the trigger circuit 16, the reset unit 22 and the gate circuit 21 will be described in greater detail later with reference to Fig. 3 while the form of the binary counting chain 17 will be referred to later with reference to Fig. 4.

The machine operates in the serial mode to a predetermined timing rhythm which is determined fundamentally, in the usual manner, by a master or so-called clock oscillator. The operating rhythm is controlled by a series of electric waveforms provided by a waveform generator unit WGU whose nature and function will next be considered in greater detail with reference to Fig. 10.

The rhythm of the machine comprises a succession of major cycles or bars, one for each computation step and each sub-divided into a number of equal-length minor cycles or beats whose individual time duration is sufficient for the expression, as a serial pulse signal train, of one basic length number or instruction word of 40 digits. These minor cycles or beats are used some (Scan beats) for effecting regular regeneration of the information stored in the various cathode ray tube storage devices and others (Action beats) for reading out, writing in and using the signals representing such stored words. In the normal machine operating rhythm there are four beats in each bar, the first and third being Scan beats S1 and S2, and the second and fourth being Action beats A1 and A2, but during transfer operations the bar length is extended to cover the time period necessary to complete the required transfer, one word being transferred during each beat.

Figure 10:
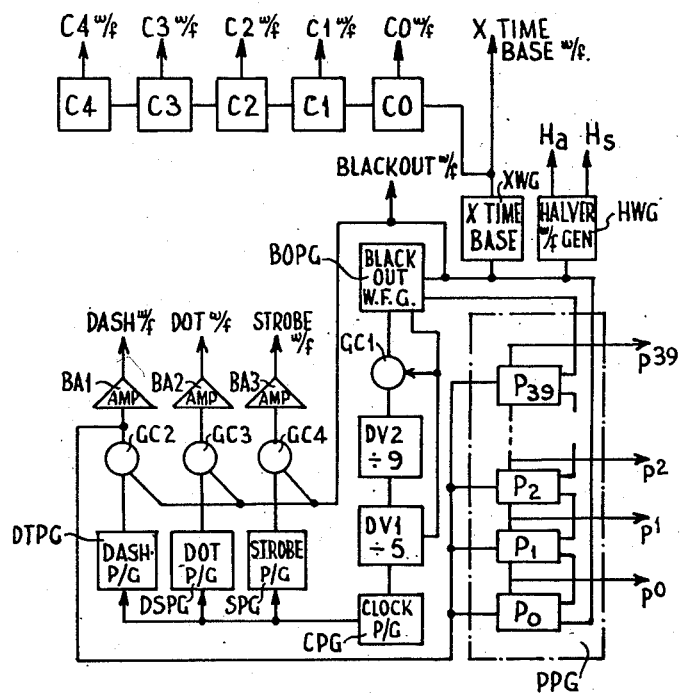
Fig. 10 is a mainly schematic diagram showing the principal rhythm controlling waveform generating means for the machine.

Referring now to Fig. 10 the master or clock pulse generator CPG comprises a stable oscillator and pulse squaring means which provides a series of square sided Clock pulses whose period time is 10 microseconds as shown in Fig. 11(a). This period time is that allocated to the expression of a single digit of a number and is known as the digit interval time or period. These pulses are applied to a divider circuit DV1 which provides a squared output pulse for every five input pulses as shown in Fig. 11(b) and the output from this circuit is applied to a second divider circuit DV2 providing a squared output pulse for every nine input pulses as shown in Fig. 11(c). These divider circuits may be of any suitable form, for instance, circuits of the well known "Phantastron" type. The output pulses from the divider circuit DV2, occur one for every 45 Clock pulses and hence serve to mark each minor cycle or beat period.

The output pulses from divider circuit DV1 are applied as one triggering input to a two-stable-state trigger or flip-flop circuit BOPG whose other or resetting input is supplied from the divider circuit DV2 by way of a gate circuit GC1 which is opened by the supply thereto of pulses from the divider circuit DV1. The resultant output from circuit BOPG is shown in Fig. 11(d) and also, to a reduced time scale in Fig. 12(a) as a positive-going pulse during the period of Clock pulses 1 to 5 of each beat and negative going for the remaining period of each beat. This waveform, which is applied to the tube cathodes, is used primarily to suppress the beams of the cathode ray tube stores during the flyback time between each scanning movement of such beams and is hence known as the Blackout waveform.

The requisite repetitive scanning motion of the cathode ray tube beams of the storage devices is provided by an X time base generator circuit XWG which is of any conventional triggered type and serves to deliver a repetitive sawtooth waveform as shown in Fig. 12(b) so that the flyback portions coincide with the positive-going portions of the Blackout waveform and the linear scanning or run-down portions with the negative-going portions of that waveform.

As explained in the aforesaid paper by Williams and Kilburn, the operation of the cathode ray tube storage device requires the provision of Dot, Dash and Strobe waveforms during each digit interval of the 40-digit period allocated in each beat to the word signal and these waveforms are provided by the pulse generator circuits DTPG, DSPG and SPG respectively which supply waveforms as shown in Fig. 11 (e), Fig. 11 (f) and Fig. 11 (g). These circuits may be of any convenient form, such as flip-flop circuits, and they are each triggered by the Clock pulses. Elimination of those pulses of each waveform which occurs during the tube blackout periods is effected by supplying the output from each generator circuit through a gate circuit GC2, GC3, GC4 which is controlled by the Blackout waveform. Each waveform is then fed to a buffer amplifier BA1, BA2, BA3 whose output constitutes the source of supply of such waveform throughout the machine. Although not shown use is frequently made in the machine of reverse polarity versions of every waveform, these being obtained in conventional manner by means of a phase inverter valve or the like. Examples of this are the $Dh$ waveform of Fig. 5(a) which is the inverse version of the Dash waveform and the $Pa$ waveform of Fig. 5 (g) which is the inverse version of the Strobe waveform.

Also as explained in the aforesaid paper by Williams and Kilburn, the alternate Scan/Action rhythm and the systematic regeneration of all of the storage lines in such cathode ray tube stores, calls for the provision of so-called Halver and Counter waveforms. The Halver-S waveform of Fig. 12(c) and its antiphase counterpart, the Halver-A waveform of Fig. 12(d) are generated in a trigger circuit HWG which is reversed by each positive-going edge of the Blackout waveform (Fig. 12(a)). The Counter 0 waveform which has twice the period time of the Halver waveform as shown in Fig. 14(e) is generated in the first of a chain of binary counter stage C0, C1, C2, C3 and C4 which are serially triggered one from another in the conventional manner. The remaining counter waveforms, C1, C2, C3 and C4, each progressively of doubled period time are derived from the succeeding stages of the counter chain.

The signals representing both number and instruction words within the machine are of the general form of which Fig. 5(b) and Fig. 5(c) are typical examples (except for the fact that only 14 out of the total of 40 digits are shown in those two diagrams). In each digit interval or period of 10 microseconds, the presence of a negative-going square pulse during the first 6 microseconds (a replica of a Dash pulse) signifies the binary digit value "1" whereas the absence of such a pulse signifies the binary digit value "0." The digits are signalled in ascending power order, the first digit in Clock pulse period 6 of each beat being representative of binary denomination $2^0$, the second in Clock pulse period 7 the binary denomination $2^1$ and so on.

For effecting selective examination of each individual digit period in turn and for other purposes there is provided a group of 40 single pulse waveforms, each on separate leads and each consisting of a single Dash pulse during each beat coincident with one only of the digit periods. These waveforms are known as p-Pulses and Fig. 11(h) shows the first of the group comprising a pulse in the first or $2^0$ digit period of each beat. This waveform is referred to as the p0-Pulse. Fig. 11(i) shows the second of the group or the p1-Pulse while Fig. 11(j) shows the last of the group or the p39-Pulse.

These p-Pulse waveforms are generated in the unit PPG of Fig. 10 which comprises a series of triggered gate circuits $p^0$, $p^1$, $p^2$ . . . $p^{39}$ all of which are supplied with the Dash waveform. Normally each circuit is in inoperative condition and produces no output but each can be conditioned for operation by the application of a positive transient voltage in readiness to provide an output pulse coincident with the arrival thereat of the next following Dash pulse. The first circuit $p^0$ is conditioned by the application thereto of the Blackout waveform while the subsequent circuits $p^1$ . . . $p^{39}$ are each conditioned by the output pulse from the preceding circuit. The circuits $p^0$ . . . $p^{38}$ are reset back to their inoperative state by potentials due to the conditioning of the next subsequent circuit while the last circuit $p^{39}$ is reset by the leading edge of the next Blackout pulse. Each circuit is therefore operative in turn for one digit interval only.

Figure 6:
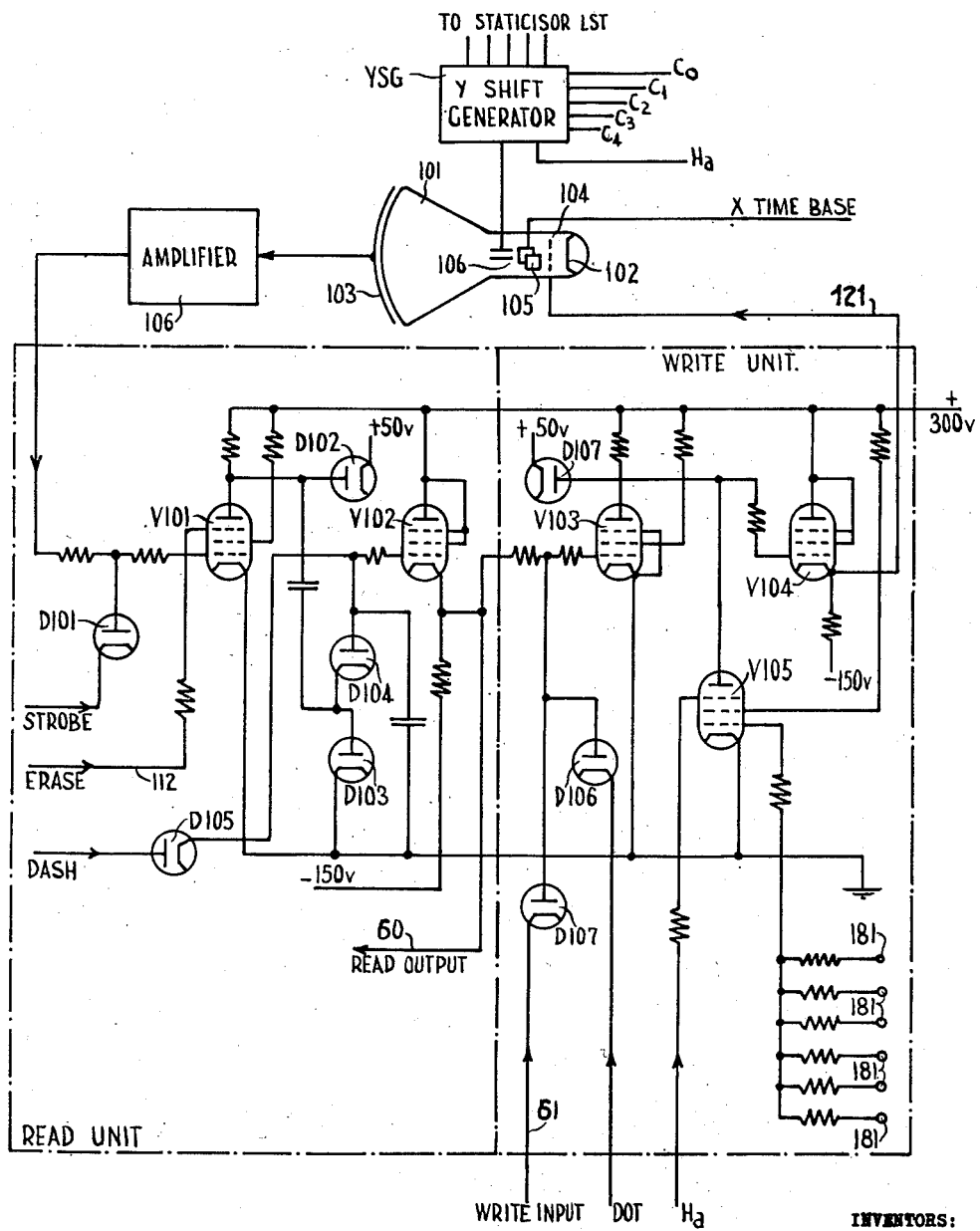
Fig. 6 is a diagram showing the general arrangement of a cathode-ray storage tube and its ancillary parts.

Fig. 6 illustrates the general form of one of the cathode ray storage tubes of the main storage device MS. The device comprises an electrostatic cathode ray tube 101 having the usual electrodes including a cathode 102, a modulating grid 104 and X and Y deflection plates, 105 and 108. A signal pick-up plate 103 is located closely adjacent the tube screen and provides output signals representative of the various charge patterns formed on such screen as the tube beam sweeps thereover. These signals are applied to an amplifier 106 and thence to a valve V101 which is normally held cut off but which may be turned on, once during each digit period by the pulses of the Strobe waveform fed thereto through diode D101. The charge pattern on the screen of the tube which represents the binary value "0" provides a negative-going transient pulse at the output of amplifier 106 whereas the charge pattern representative of binary value "1" provides a positive-going transient at such amplifier output. In consequence, the valve V101, is turned on by the Strobe pulse only when a "1" digit signal is received thereat. The anode output from valve V101 is fed by way of a network including clamping diodes D102, D103 and D104 to cathode follower valve V102 which is also supplied with the Dash waveform (Fig. 1(f)) by way of diode D105 and provides a reshaped, i. e. Dash pulse on the read output lead 50 whenever a positive or "1" signal is received from the signal pick-up plate 103 but not otherwise. These components constitute what will hereinafter be called the Read unit of the storage device.

In addition to being externally available on lead 50 the output signals from valve V102 are also fed to valve V103 which operates as an amplifier which is normally fully turned on but which is repeatedly cut-off during each digit period by application of the Dot waveform (Fig. 11(e)) by way of diode D106. The anode output of this valve V103, in the form of positive-going square pulses limited at +50 v. by diode D107 is applied to a cathode follower valve V104 and the output of the latter is fed to the modulating electrode 104 of the tube 101 to modulate the tube beam. In the absence of any output from valve V102, a series of Dot pulses are used to modulate the tube beam but when a "1" signal is supplied from the amplifier 106, such Dot pulses have Dash pulses from valve V102 superimposed thereon whereby the tube beam is modulated by a Dash instead of a Dot to record "1" instead of "0" on the tube screen thereby effecting regeneration of the previous record. Instead of utilizing the signal output from valve V102, i. e. the Read output, to control valve V103, external pulse signals, such as those of Figs. 5(b) and 5(c) may be applied on the write input lead 51 through diode D107. If necessary, the signals arriving from the amplifier 106 can be suppressed, thereby erasing the previous record, by applying a negative voltage on lead 112 to valve V101. The valves V103 and V104 and their associated components constitute what will hereinafter be called the Write unit of the storage device.

Figure 13:
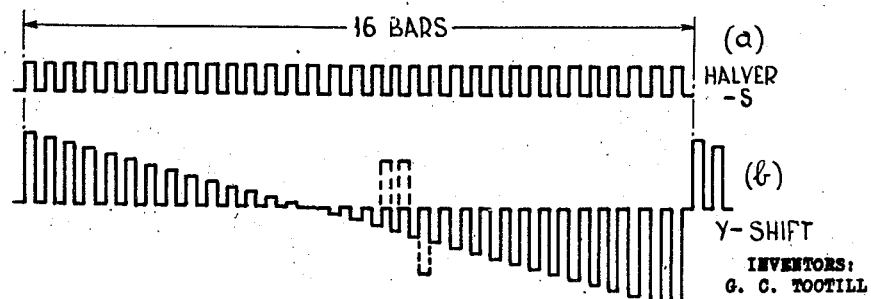

During normal operation the tube beam is caused to scan each of its 32 parallel storage lines, each holding one 40-digit word in turn during 32 consecutive Scan beats to effect systematic regeneration of the store contents and is also caused to scan any selected line during the intervening Action beats by the conjoint action of the X time base waveform of Fig. 12(b) applied to the X deflection plates and the Y-shift waveform of Fig. 13(b) applied to the Y deflection plates. The latter waveform is derived from the Y-shift generator circuit YSG which is controlled, during Scan beats, by the Halver and Counter waveforms and during Action beats, by the selection of static potentials set up by the staticisor LST to be described later in response to the address selection digit configuration of an instruction word. Details regarding the form of such Y-shift generator together with further detailed information upon cathode ray tube storage devices and their principle of operation are to be found in the aforesaid paper by Williams and Kilburn.

When more than one storage tube is used in the main storage means, as in the example shown, it is necessary to effect regeneration of all tubes during Scan beats but to suppress all but the desired single tube during the intervening Action beats. This is effected by the provision of a so-called black-out valve V105 connected between the control-grid of valve V104 and the earth line. When valve V105 is conducting, the control-grid potential and hence the cathode potential of valve V104 is lowered to an extent which causes suppression of the associated tube beam whereas when such valve V105 is cut-off, the valve V104 operates normally as already described. Valve V105 is supplied at its suppressor grid with the Halver-A waveform, Fig. 12 (d) so that it and all other similar valves are cut-off during Scan beats while its control grid is connected by way of six separate parallel leak resistances to terminals 181 which in turn are connected to appropriately selected output terminals of those sections of the staticisor LST which are concerned with the digits of the instruction word governing tube selection. Each tube has its terminals 181 connected to a different selection of staticisor outputs so that only one tube of the plurality available has all of its leaks connected simultaneously to a suitable negative potential. Unless all the leaks are thus supplied the valve V105 remains conducting and the associated cathode ray tube is suppressed. Thus one tube alone is operative during Action beats. The valve V105 and its associated leaks constitute a so-called "coding valve" arrangement by which a potential change at the anode of the valve and usable for, say, gate control purposes, is made available only by one particular combination of input potentials.

Figure 7:
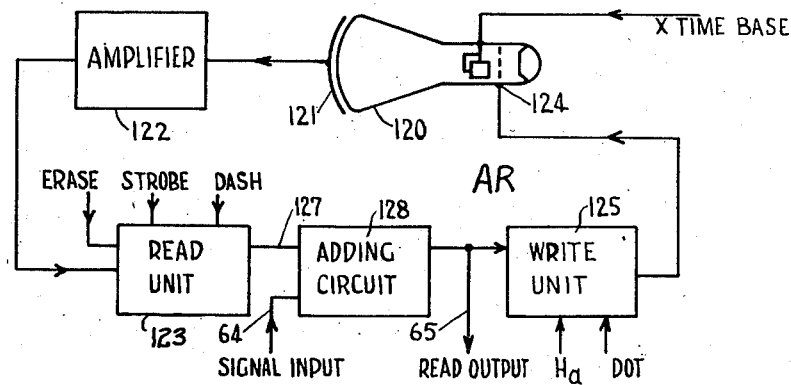
Fig. 7 is a diagram showing the general arrangement of an accumulator device embodying a cathode ray storage tube.

Referring now to Fig. 7, the accumulator AR comprises a single cathode ray storage tube 120 with its signal pick-up plate 121 connected by way of amplifier 122 to a read unit 123 as in the device of Fig. 6 just described. The modulating grid 124 of the tube is likewise supplied from a write unit 125 but instead of the read and write units being directly interconnected as in Fig. 6 the read output lead 127 is connected to one signal input terminal of an electric signal-operated adding circuit 128, the other input of which constitutes the external signal input 64 of Fig. 1. The output lead from the adding circuit provides the input for the write unit and also supplies the read output lead 65 of Fig. 1. The general construction of the device is as already described with reference to Fig. 6 but as, in the sample example given, one storage line alone is required, no Y shift is required.

In the normal operation of such a device the first applied number-representing signal is stored in the single storage line by application to the input lead 64 whereby it is applied to the adding circuit 128 in synchronism with a series of "0" signals from the hitherto empty storage line arriving by way of the amplifier 122 and read unit 123. The answer number, i. e. the input number unaltered, which is available at the output of the adding circuit is then used to control the write unit 125 whereby such input number is written into the storage line of the tube and will thereafter be continuously regenerated until further use of the accumulator takes place. Upon the arrival, in a succeeding bar, of another input number on lead 64, this will be added to the number already in the store by the action of the adding circuit 128 and the answer or sum-representing number will be applied instead to the write unit 125 for storage in the tube. Such answer number is also available as an external signal on the read output lead 65. Clearing of the content of the accumulator at any time is effected by applying a suitable erase potential to the read unit 123 as in the main storage device already described with reference to Fig. 6.

The arrangements of the control system CL are shown in schematic form in Fig. 8 and comprise a further cathode ray storage tube 130 arranged with a regenerative loop consisting of amplifier 131, read unit 132, adding circuit 133 and write unit 134 between its signal pick-up plate 135 and its beam modulating electrode 136. In these respects it closely resembles the tube of the accumulator but unlike the latter, it has two separate storage lines which are selected by the CL-Y waveform of Fig. 14 (c) which is generated in the waveform generator circuit CYWG to be described later. As will be seen from Fig. 14 (c) the tube beam will scan one line (known as the CI line) during the first and fourth beats, S1 and A2 and the other line (known as the PI line) during the second and third beats, S2 and A1, of each bar.

The second input of the adding circuit 133 constitutes the signal input lead 70 to the device and this is connected by way of a gate circuit G3 (Fig. 1) to the read output lead 62 of the main storage means MS. The gate G3 is of the AND type controlled by the Halver-A and CL-Y waveforms so as to be open only during beat A1 of each bar. The lead 70 is also supplied by way of an AND gate circuit G4 with the $p0$-Pulse waveform. This gate circuit G4 is controlled by a voltage provided in a unit CYWG, to be described, so as to be open only during beat S1 of a bar.

Figure 14:
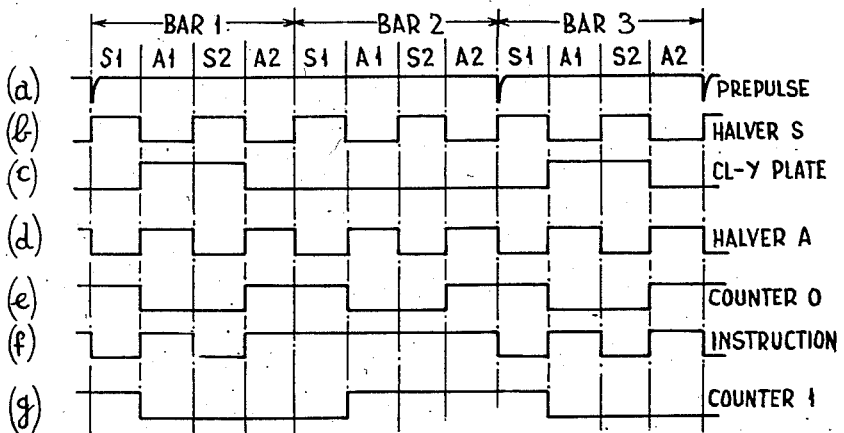
Figure 12:
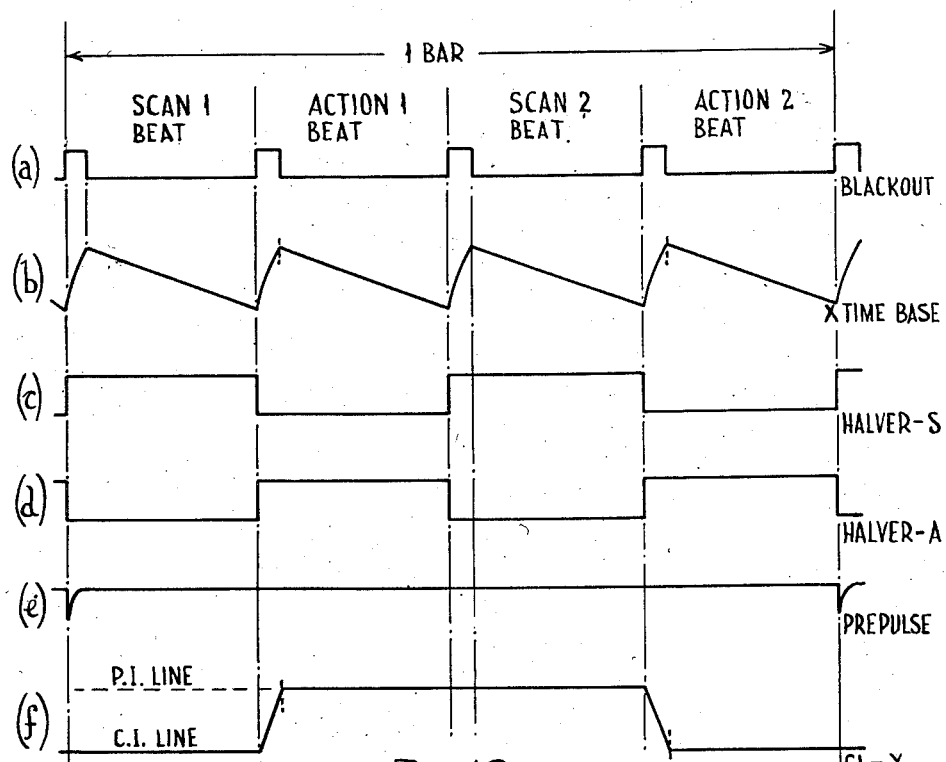

The commencement of each bar of operation is marked by the generation of a sharp pulse-form starting signal, known as a Prepulse as shown in Fig. 12 (e) and these signals are generated in a Prepulse generator circuit PPG which essentially comprises a two-stable state trigger circuit 140 which is triggered by the positive-going edge of the Counter 0 waveform, Fig. 14 (e), at the end of each S2 beat. When in this triggered condition the trigger circuit 140 delivers a potential which opens gate circuit G5 to allow the next following negative-going edge of the Halver-A waveform to generate, through a differentiating circuit, the requisite negative Prepulse signal on lead 141.

The trigger circuit 140 is reset by the next following negative-going edge of the same Counter 0 waveform to close gate circuit G5.

The application of the Counter 0 waveform to the triggering input of trigger circuit 140 is by way of an AND gate circuit G6 which is normally held open by the potential delivered from a further trigger circuit 142 when in its reset state. This latter circuit is normally held in such reset condition by the continuous application thereto of the Prepulse signals by way of lead 143 but the circuit can be triggered in certain conditions when it is desired to stop computation by a triggering input derived from a decode valve 144, which resembles that of the valve V105 of Fig. 6 previously described, and operated only upon the occurrence of a certain combination of digit signals in an instruction word currently operative in the machine and set up on the staticisor FST. The trigger circuit can also be triggered by an equivalent input on lead 145 derived from the cathode follower valve 19, Fig. 1. Such trigger circuit 142 and its associated parts therefore constitute the stop unit 20 of Fig. 1.

The unit CYWG comprises a first two-state trigger circuit 146 which is triggered by each issured Prepulse signal on lead 147 and is reset by the next negative-going edge of the Halver-S waveform, Fig. 14(b). When reversed from its triggered to its reset state, i. e. at the end of beat S1 of each bar, it causes triggering of a second trigger circuit 148 over lead 149. This second trigger circuit 148 is then reset by the next following negative-going edge of the Halver-S waveform at the end of beat S2 whereby the output from such trigger circuit 148 constitutes the requisite line shift or CL-Y waveform of Fig. 14(c). The output from trigger circuit 146 also provides the control potential for gate circuit G4 previously described so as to open the latter during beat S1 of each bar and thus allow the $p0$-Pulse, which is of numerical value $2^0$, i. e. unity, to be applied to the adding circuit 133.

Figure 15:
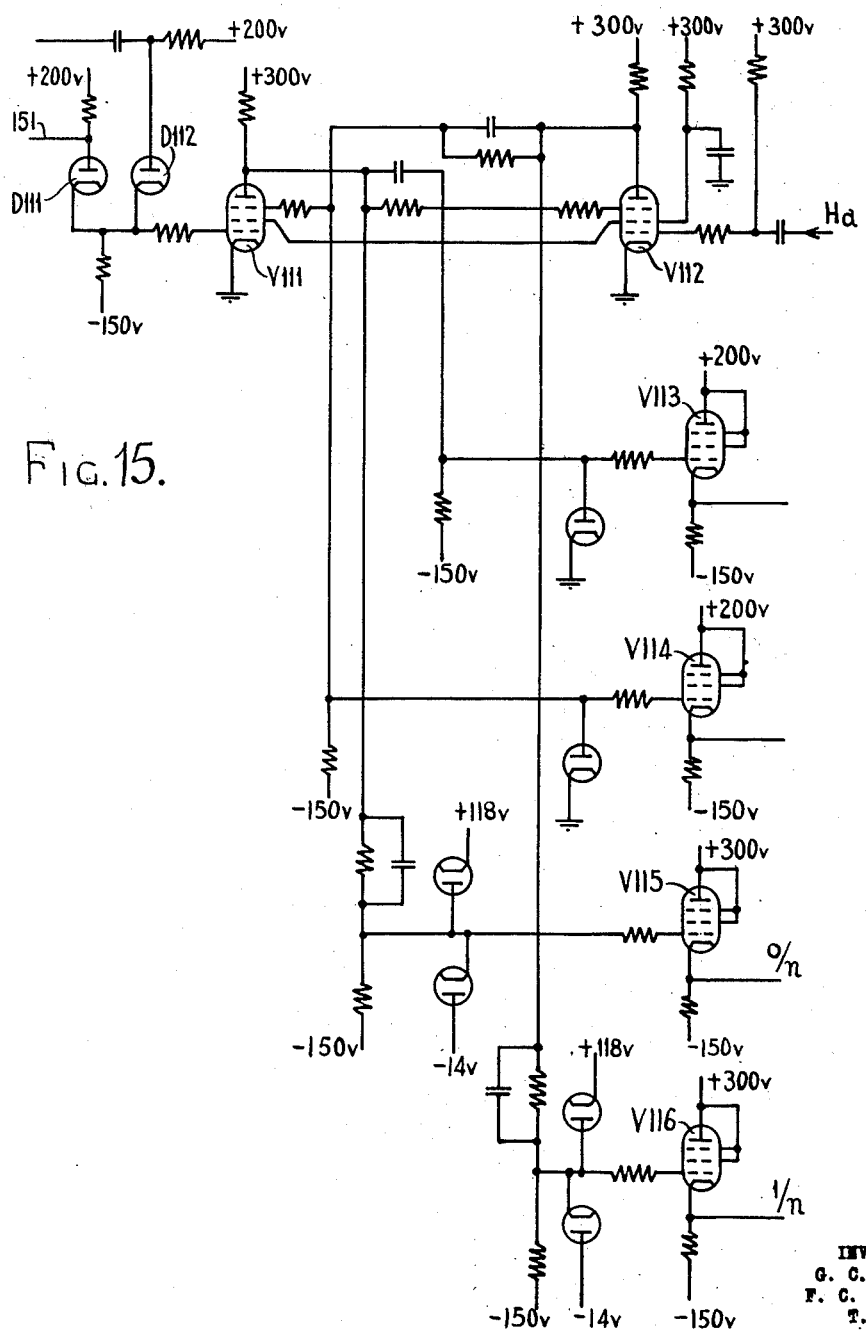
Fig. 15 is a circuit diagram of a typical staticisor section.

The read output from the storage tube 130 of the control system store, on lead 150 is applied by way of a gate circuit G7 controlled by the Halver-A waveform to be open during beats S1 and S2 and closed during beats A1 and A2 of each bar. When open this gate circuit allows the passage of signals from the lead 150 to lead 151 feeding each of the 40 separate sections of two staticisor units LST and FST. These staticisor sections are each of the form shown in Fig. 15 and comprise essentially a two-stable state trigger circuit of valves V111 and V112 which can be triggered to turn valve V111 off only upon the simultaneous occurrence of an input "1" representing signal pulse on lead 151 supplying diode D111 and a particular one of the $p$-Pulse series applied to the diode D112. Diodes D111 and D112 thus form an AND gate which selects and examines one digit period only of each applied signal. As each of the staticisor sections are supplied with a different one of the $p$-Pulse series, each examines a different digit of the applied signal and the subsequent state of each of the trigger circuits represents, in static form, the nature of the applied transient signal, the trigger circuit if triggered representing digit value "1" and if still reset, the digit value "0." All of the trigger circuits are reset in parallel by the negative-going edges of the Halver-A waveform at the ends of the A1 and A2 beats.

The setting state of the trigger circuit of each staticisor section is signalled externally by the output potentials provided by four separate cathode follower stages of V113, V114, V115 and V116. The outputs of stages V115 and V116 which need only be considered here, known as the 0/n and 1/n outputs (where n indicates the number of the signal digit examined by the particular staticisor section) are antiphase versions, one of the other, the terminal 0/n giving a negative gate-operating potential only while the section is in its reset or "0" representing state and the 1/n terminal such negative gate-operating potential only when the same section is in its triggered or "1" representing state.

Reverting now to Fig. 8, the five sections 0, 1, 2, 3, 4 of staticisor LST supply potentials from their 1/n output to a Y-shift generator circuit YSG which is substantially equivalent to that shown in Fig. 35 of the Williams and Kilburn reference paper previously quoted except that said staticisor output potentials control gate circuits which form the equivalent of the hand switches S0, S1 . . . S5 described and shown in that publication. This Y-shift generator provides a stepped waveform for the tubes of the main storage means MS which is of the form shown in Fig. 13(b) by which each of the 32 lines on each tube is scanned and regenerated in turn during successive scan beats S1, S2, S1, S2 . . . of 16 bars while the particular line scanned during each intervening Action beat is determined by the setting of the aforesaid 5 sections of the staticisor LST.

As will thus be seen the first five digits of an instruction word determine which line of a storage tube in the main storage means MS is to be operative at any one Action beat. Further digits, say those of 5–10, can be allocated to determining which tube out of a number of tubes in such store is to be operative by applying different combinations of the 0/n and 1/n outputs to the six input terminals of each valve V105, Fig. 6, of each storage tube. Thus tube No. 1 would be signalled by the digits 000000 in digit positions 5–10 of the instruction and would have each leak input connected to the 0/n terminal of the staticisor sections 5–10.

Other digits of the instruction word, similarly operative upon the function staticisor FST, are applied to determining the particular operation which is to be performed by opening and closing different gate circuits, stimulating different units into operative state and so on. Thus the stop unit 70 of Fig. 8 is shown connected to the 1/13, 1/14 and 1/15 staticisor terminals and will be activated to stop the machine whenever the instruction word in current use has "1" digits in the p13, p14 and p15 positions. Other digits are similarly allocated to other special purposes including those controlling transfer operations between the main storage means MS and the subsidiary magnetic store.

The basic rhythm of operation of the control system shown in Fig. 8 and so far described is as follows. Upon the release of a Prepulse on lead 141, a p0-Pulse is immediately released through gate G4 and is added to the number already existing, known as the Current Instruction, on the C. I. storage line in tube 130. This number, thus increased by unity, is regenerated and, at the same time, is read out over lead 150 and gate G7 to the staticisors LST and FST. As this Current Instruction merely defines the address of the next required instruction, known as the Present Instruction, in the main storage means MS, all the digits effective upon the staticisor FST are "0" and the latter is unaffected. During this first, S1, beat of the bar, the tubes in the main store have all been regenerating on a line determined by the stepped operation of the Y-shift generator circuit YSG.

At the commencement of the next, A1, beat the control of the Y-shift generator circuit YSG reverts to the staticisor sections LST whereby the correct line holding the next required Instruction word is scanned (instructions are normally placed in sequential lines of one or more tubes in the required order). At the same time, the CL-Y waveform shifts the beam of tube 130 to the other or P. I. storage line so that the selected instruction number is then read out by way of leads 62, 70 and gate G3 into such P. I. line of tube 130. Gate G7 is closed during this beat so that this signal which is present on lead 150 does not affect the staticisors LST and FST.

During the next beat, S2, the beam of tube 130 continues to scan the P. I. line to regenerate the number just delivered and, as gate G3 is now closed to prevent any input from lead 70 while gate G7 is opened again, this P. I. number is fed to the staticisors LST and FST which have meanwhile been reset to zero. Such staticisors are thus now set up with the required operation controlling Present Instruction number. Meanwhile normal systematic regeneration has been going on in the tubes of the main storage means MS.

In the fourth beat, A2, scanning control of the main storage tubes in unit MS again reverts to the staticisor LST whose new setting determines which line in which tube is to be used in the ensuing beat. Similarly the setting of the various sections of the function staticisor FST determine, by their various control potential outputs, which gate circuits are to be closed or open and which units are to be operative. During such fourth beat, A2, the required operation is carried out between the determined storage addresses. In the present case where a subsidiary magnetic store is provided, certain of the digits handled by the staticisor FST are used for putting into operation a modified form of operation which is exclusively concerned with transfer operations between the main storage means MS and the subsidiary magnetic store 9.

The additional elements concerned with such transfer operations comprise a further magnetic transfer staticisor MST having 40 separate sections and substantially identical in form with the staticisors LST and FST just described. The signal input to this magnetic staticisor MST is by way of lead 170 and gate circuit G9 from the main storage means output lead 62. The gate circuit G9 is controlled by a decode valve circuit 171 which resembles that of valve V105 of Fig. 6 and is operated by the last five sections of the function staticisor FST to cause opening of gate G9 only when a specific combination of digits in the Present Instruction signals a magnetic transfer operation.

Under such conditions, during the A2 beat of the bar, the number selected from the main storage means MS is a special Magnetic Transfer Instruction and this is fed by way of gate G9 to the magnetic staticisor MST, the other computing elements of the machine being out of use due to the control exercised by the function staticisor FST in the usual way. When such a Magnetic Transfer Instruction is called for by the nature of the aforesaid last five digits of the Present Instruction word on the staticisors LST and MST and the accompanying operation of the decode valve 171, the normal four beat to the bar rhythm is suspended by the suppression of the Prepulse signals for a time period covering that of the required transfer, which is normally that involved in the transfer of one or two complete 32 line tube fillings of a store unit, such as Store 0, Fig. 1.

The setting up of the staticisor MST provides, in like manner to the staticisors LST and FST, a number of static control potentials at the outputs of each staticisor section and these are used, again as with the staticisors LST and FST, in different combinations to control gate and other circuits. Thus a group, sections 14–24, control the selection of the required magnetic storage track through the write and read tree circuits 8 and 10, Fig. 1 while another group, sections 25–29 control the selection of the required store unit, Store 0, Store 1 . . . while still further digits in sections 30–34, control other functions including the D digit, section 30, which determines according to whether it is a "0" or a "1" whether the transfer is to be from the store means MS to the magnetic store or vice versa which another digit, the Ch digit, section 34, determines whether or not a check operation according to the present invention is to be performed or not. Further digits include the S/T digit, section 31; the G digit, section 32 and the R digit, section 33 which are involved in determining whether both tubes or only one tube of a store unit are involved in the transfer and the order in which such tubes are to be used. As these refinements are in no way concerned with the present invention they will not be further described.

At the end of a transfer operation, the magnetic staticisor is reset to zero and the previous inhibition of Prepulse signals is removed whereby the machine reverts to the normal four-beat to the bar rhythm previously described.

Figure 9:
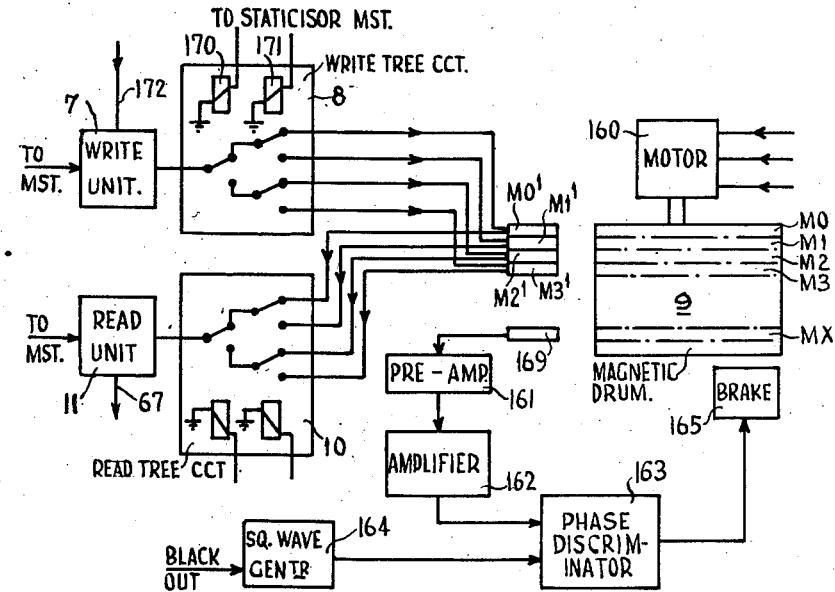
Fig. 9 is a diagram showing the general arrangement of a magnetic drum type subsidiary data item store.

The form of the magnetic storage device is shown in Fig. 9. Such device closely resembles that described by A. A. Cohen et al., in Technical Monograph No. 4801 by Engineering Research Associates Inc., May 1, 1948, and comprises a cylindrical drum 9 of non-magnetic metal coated with a recording layer of nickel. In fixed positions closely adjacent the drum surface are disposed a number of pairs of recording/reproducing heads M0', M1', M2', M3' each of substantially conventional form, e. g. as used in magnetic tape recording, and dealing, one recording/reproducing head pair with a different circumferential strip or track M0, M1 . . . around the drum.

The drum is constantly rotated by an electric driving motor 160 and its speed of rotation is adjusted so that each endless track contains a recording of an integral number of instruction or number words which are inserted in and reproduced from the drum in precise timing synchronism with the digit periods and beat interval times of the machine rhythm as determined by the Clock pulse generator CPG, Fig. 10. For this purpose the drum is provided with a separate time marker track MX in which are recorded pulse signals marking the end of each word position relative to the heads M0' . . . M1'. Signals from this track, picked up by the head 169 are amplified in a preamplifier 161 and then in a main amplifier 162 before being fed to a phase discriminator circuit 163 where they are compared in timing with signals developed in a square wave generator 164 from the Blackout waveform. The motor is arranged inherently to drive the drum slightly faster than the correct synchronous speed and is restrained to a variable extent by an electromagnetic brake 165 which is energised by a current whose value is adjusted by the discriminator circuit 163 in accordance with any measured phase divergence so as to correct the drum position at any time.

Selection of the required one of the plurality of recording heads is effected by a relay tree circuit of conventional form operated by relay magnets such as indicated at 170, 171 which are energised selectively in the required manner by the outputs from the particular track selecting sections (14-24) of the magnetic staticisor MST already referred to.

The energising currents for effecting recording are developed from the incoming pulse signal train on lead 172 in a power amplifier circuit or write unit 7 which is also provided with a suppressing bias control lead which is supplied, according to whether the wire unit is to be operative or not, from the aforementioned D digit section of the magnetic staticisor MST so as to be effective only when transfer is inwards to the drum.

Figure 5:
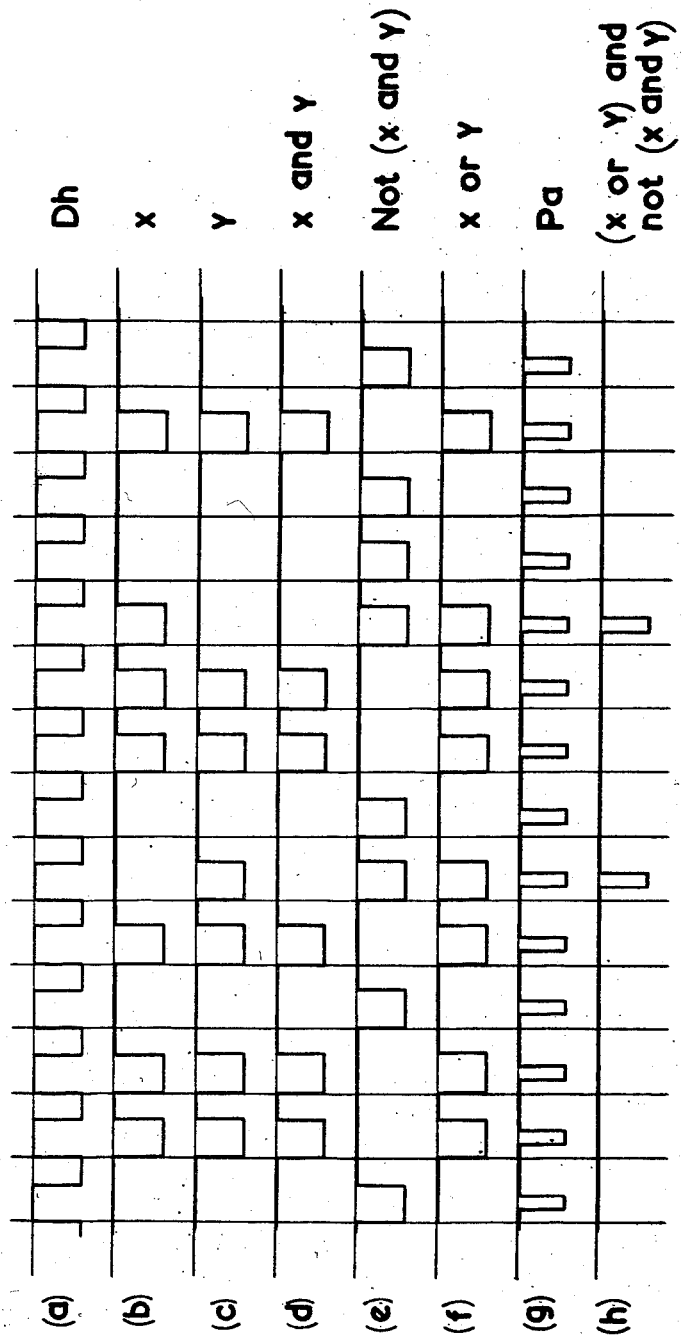
Figure 5 shows voltage waveforms occurring at various parts of the circuits shown in Figure 2.

The reproducing heads are selected in similar manner in a tree circuit 10 likewise controlled by the track selecting sections of the magnetic staticisor MST and the output from the selected head after amplification, is suitably reshaped in the read unit 11 to reconstitute pulse signal trains of the form shown in Fig. 5 (b) and 5 (c). The read unit contains bias suppressing means, similar to the write unit 7, and also controlled by the D digit section of the staticisor MST so as to be operative only when transfer is from the drum.

The action of a typical check transfer will now be described. The instruction programme defined by the stored series of present instruction words is divided into a number of blocks of sequential instructions, each of which supplies a discrete partial answer. At the end of each of these blocks of instrutcions three additional instructions are inserted so that a complete programme of instructions will appear as follows assuming that each block of sequential instructions consists of ten instructions.

1. Transfer contents of track M0 to tube T00.
2.
.
.
.
9.
10. Final instruction producing first partial answer on tube T01.
11. Check contents of tube T01 with track M10.
12. Write contents of tube T01 on track M10.
13. Transfer control to instruction 1.
14. Transfer contents of track M1 to tube T10.
15.
.
.
.
22.
23. Final instruction producing second partial answer on tube T11.
24. Check contents of tube T11 with track M11.
25. Write contents of tube T11 on track M11.
26. Transfer control to instruction 14.
27. Transfer contents of track M2 to tube T00.
28.
.
.
.

At the start of the problem a block of words is transferred from track M0 of the magnetic store 9 to the cathode ray tube store T00. This transfer may be readily organised by arranging that the special magnetic instruction word required to effect this initial transfer comprises only "0" digits. When this transfer of the first block of words is completed the computing circuits (comprising the control and accumulator circuits referred to above and utilize the instruction words in sequential fashion until the computations which can be performed on the first block of data are completed. This is assumed to be completed after instruction 10 of the above list has been obeyed and the result of all these computations is then recorded on cathode ray tube T01 and constitutes the first discrete partial answer to the problem.

The next instruction (instruction 11) causes a number to be read out of the cathode ray tube store T00 and utilized as a magnetic transfer instruction and the presence of a check (Ch) digit 0 in the magnetic instruction word results in the contents of tube T01 being checked against the contents of track M10 in the magnetic store 9. This track M10 is the first of a number of tracks in the magnetic store reserved for the recording of partial answers and thus it will initially be blank that is it will be storing a succession of "0"s. Therefore, providing the first partial answer stored on tube T01 is not zero a non-check will automatically occur when the contents of track M10 and tube T01 are compared as a result of instruction 11. The check trigger circuit 16 will be set and the unit 21 will cause a 1 to be added to the control instruction number in the control system CL in the normal manner so that instruction 12 is the next instruction to be obeyed and the partial answer on tube T01 is written on to track M10. The next instruction 13 transfer control back to its initial state at the beginning of the solution so that instruction 1 is next obeyed. The contents of track M0 are thus written into the tube T00 once again, the data being written over the contents already there, which although theoretically identical with the data being written in, may have accumulated errors.

The machine now automatically repeats the operations involving the first block of data and controlled by the first ten instructions and when instruction 11 is again obeyed the contents of track M10 which is the originally obtained first partial answer is compared with the result of the second computation of the first partial answer stored on tube T01.

This is the first real check between two successive identical computations, as the first comparison of the contents of tube T01 and track M10 did not constitute a check on the reliability of the first partial answer but had to be performed so that the three special instructions 11, 12 and 13 could be made to set up a continuous re-checking process. It will be appreciated that this uninformative but unavoidable check only occupies the time taken to obey one instruction out of at least 24 instructions in this example when a block of instructions is assumed to be 10 instructions so that the loss of time is not serious.

If this first real check shows that there is a non-identity between the contents of tube T01 and track M10 then the unit 21 will arrange for a 1 to be added in the usual way to the control instruction number in the control system CL so that instruction 12 is next obeyed and the contents of tube T01 which is the result of the second computation of the first partial answer is written onto track M10 in the magnetic store 9 in place of Y the result of the first computation of the first partial answer already there. Instruction 13 causes the control to be "transferred back" to instruction 1 as before and the whole checking process is again repeated until the results of two successive computations of the first partial answer when instruction 11 is obeyed are identical. The unit 21 then arranges for +3 to be added to the control instruction number in the control system CL so that instruction 14 is the next instruction to be obeyed.

The checked first partial answer is thus preserved on track M10 in the magnetic store 9 and a new set of digital data is transferred from track M1 of the magnetic store to tube T10 and various computations are performed as directed by instructions 14 to 23. Instruction 23 is the final instruction which produces the second partial answer on tube T11 and instruction 24 causes the contents of tube T11 to be compared with the contents of track M11 the second of the series of tracks in the magnetic store 9 reserved for storing the partial answer to the problem. As the track M11 is, at this time, empty or blank, a non-check will be indicated, and instruction 25 will cause the result of the first computation of the second partial answer to be transferred from the tube T11 to the track M11. Instruction 26 then causes the control to be transferred back to instruction 14 so that when instruction 23 has been obeyed again the result of the second computation of the second partial answer will be recorded on tube T11. Instruction 24 causes the result of this second computation to be compared with the result of the first computation of the second partial answer now stored on track M11, and as previously described this partial answer, or if a non-check occurs finally a checked partial answer, will be preserved on track M11 and instruction 27 will be obeyed and a third block of information will be transferred from track M2 in the magnetic store to the tube T00 say.

It is not essential that each block of operations preceding a check should be such that the next instruction to be obeyed after a checking operation is terminated is an instruction causing a block of data to be transferred from the magnetic store to a cathode ray tube store as has been the case in the particular programme of instructions just considered. Checks may be inserted at intervals during the sequence of operations involved in fully utilizing all the data simultaneously existing in the cathode ray tube stores of the machine. In such a case the instruction selected by the third instruction following the instruction to check must be designed to cause the machine to continue its sequential progress through the existing data in the cathode ray tube stores.

The method of controlling the transfer of information to and from the magnetic store has already been described in outline and the additions to and application of this control to enable a checking operation to take place will now be described. The transfer of information to and from the magnetic store is controlled by five specially allotted and so-called function digits in the magnetic transfer instruction word. The function of these digits are as follows:

(a) A Direction or "D" digit which specifies the direction of transfer, electrostatic store to magnetic store or vice versa. During a checking operation the "D" digit must always call for a transfer from the magnetic to the electrostatic store as information must not be written into the magnetic store while information is being read out of the store into the check unit.

(b) A Store/Tube or "S/T" digit which specifies whether a whole store element, comprising a pair of tubes, or only one tube of information is to be transferred.

(c) A "G" digit which determines whether the actual comparison of a tube of information takes place in a scan or action period. This digit has no significance when a whole store is scanned.

(d) An "R" digit which determines the order of scanning the two tubes of a store or if only one tube is being scanned, whether this takes place in a scan or action period.

(e) The "Ch" digit which determines whether a check shall be made or not.

An actual code by which these function digits can set up six different kinds of checking operation is as follows:

| Checking operation | D | S/T | G | R | Ch |
|---|---|---|---|---|---|
| (1) Even numbered tube with track during scan periods | 0 | 0 | 0 | 0 | 1 |
| (2) Odd numbered tube with track during scan periods | 0 | 0 | 0 | 1 | 1 |
| (3) Even numbered tube with track during action periods | 0 | 0 | 1 | 1 | 1 |
| (4) Odd numbered tube with track during action periods | 0 | 0 | 1 | 0 | 1 |
| (5) Even numbered tube with track in scan periods and odd numbered tube with track in action periods | 0 or 0 | 1 | 1 | 0 | 1 |
| (6) Even numbered tube with track in action periods and odd numbered tube with track in scan periods | 0 or 0 | 1 | 1 | 1 | 1 |

From this table it will be seen that the D digit which controls the magnetic inward and outward transfer gates 6 and 12 is always 0 when the check digit Ch is 1 so that the inward transfer gate is closed during a checking operation. As shown in Figure 1 the Ch digit is applied to the non-equivalence circuit 15 so that it is operative only when the Ch digit is 1. Thus for all checking operations the D digit is 0 and the Ch digit is 1 and the actual type of check is controlled by the three digits S/T, G and R. Of these three digits the S/T and G digits together control the waveform of the voltage J generated by the J waveform generator 23 and which is applied to the non-equivalent circuit 15. The requirements for the J voltage waveform are such that when:

(1) The S/T digit is 1, the J voltage waveform allows the circuit 15 to operate during both scan and action periods.

(2) The S/T digit is 0 and the G digit is 0, the J voltage waveform allows the circuit 15 to operate during action periods only.

(3) The S/T digit is 0 and the G digit is 1, the J voltage waveform allows the circuit 15 to operate during scan periods only.

As described in the aforesaid paper by Williams, Kilburn and Tootill, a cathode ray storage tube not required to be operative is rendered inoperative by the action of a special black-out valve which inhibits the electron beam of the tube during action periods. The two tubes in a store, for example the tubes T00 and T01 of Fig. 1, are arranged to have interlaced operative periods so that under normal operation lines of information stored on the rasters of T00 and T01 are read out in the following order:

Line 0 on tube T00—1st scan beat
Line 0 on tube T01—1st action beat
Line 1 on tube T00—2nd scan beat
Line 1 on tube T01—2nd action beat
Line 2 on tube T00—3rd scan beat etc.

This in fact is the sequence when the R digit is 0. When the R digit is 1 the order in which information is read out of the store is as follows:

Line 0 on tube T01—1st scan beat
Line 0 on tube T00—1st action beat
Line 1 on tube T01—2nd scan beat
Line 1 on tube T00—2nd action beat
Line 2 on tube T01—3rd scan beat etc.

It will thus be seen that when the S/T digit is 0 and the G digit is 0 the J voltage waveform allows the non-equivalent unit 15 to be operative during scan periods and hence the R digit determines whether the contents of tube T00 or T01 is applied at X during the operative scan periods. To illustrate this code the five magnetic function digits which will cause the contents of tube T01 to be checked with the contents of M10 (instruction 11 in the example of a programme of instructions given above) would be 00011 if the check was required to take place in scan periods and 00101 if the check was required to take place in action periods.

Figure 3:
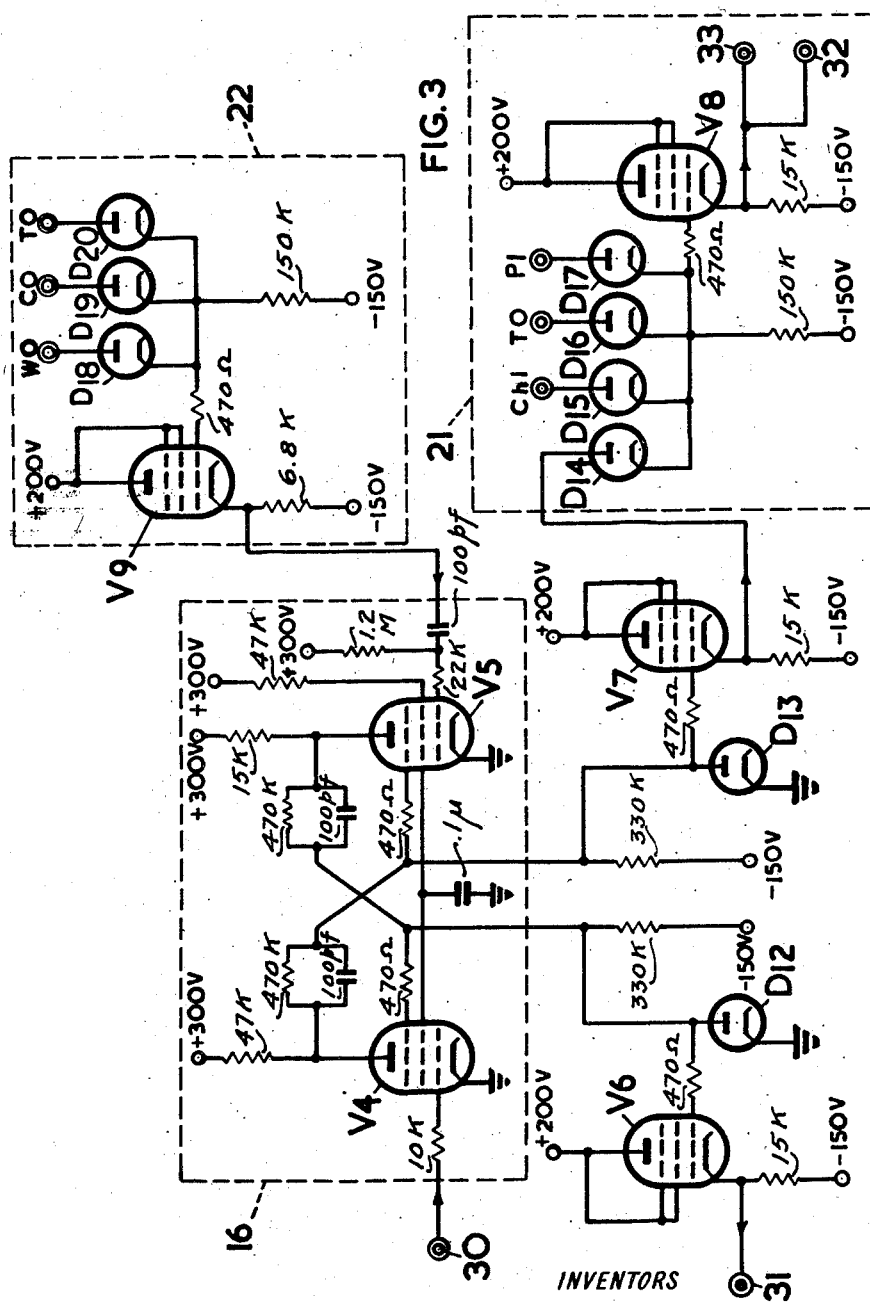
Figure 4:
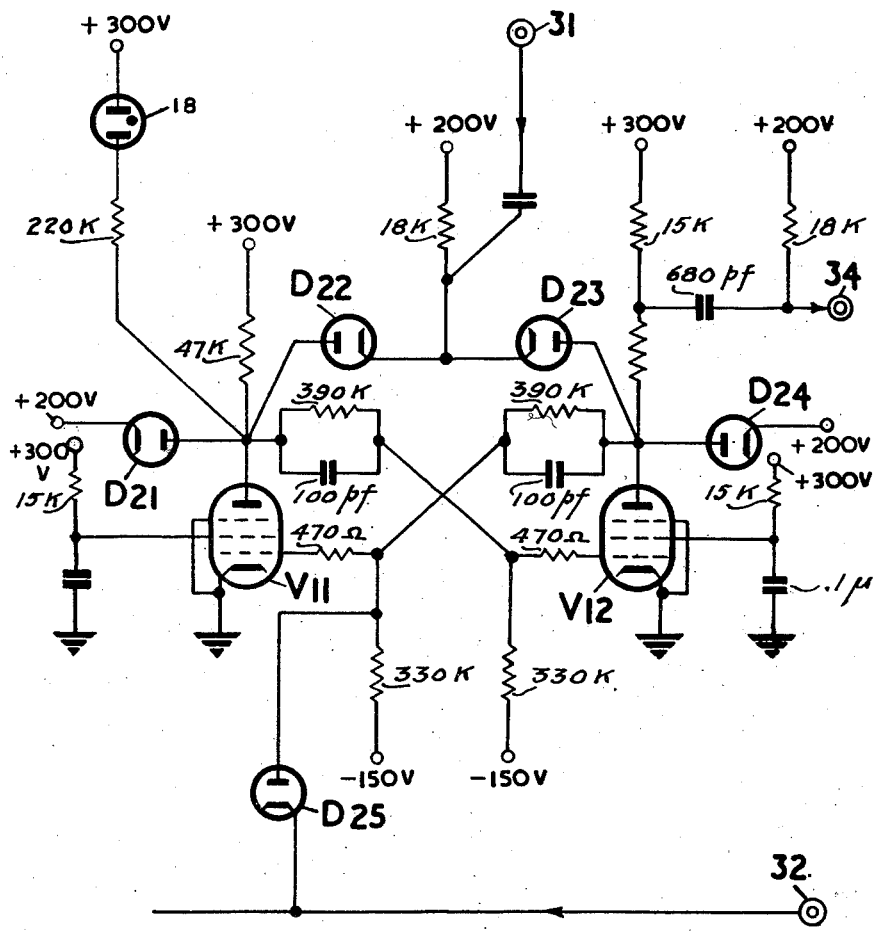

It, therefore, remains to give a detailed description of the checking circuits 15 to 21 shown in Figure 1 and such a description will now be given with reference to Figures 2, 3 and 4 of the accompanying drawings. Figure 2 shows details of the non-equivalent circuit 15, Figure 3 shows details of the check trigger 16 and associated circuits, Figure 4 shows details of the first of the binary counters 17 while Figure 5 shows typical voltage waveforms occurring at various parts of the "non-equivalent" circuit 15.

The non-equivalent circuit 15 is designed to make use of the fact that if two digits each of which may be 0 or 1 are not to be the same then their sum must be equal to 1. The inputs X and Y are therefore firstly fed into an "OR" gate which is a circuit designed to produce an output when a 1 digit is present in either input channel. An "OR" gate will however produce an output when a 1 digit is present in both channels so that this case must be prevented from giving a final indication of non-equivalence. The inputs X and Y are therefore secondly fed to an "AND" gate which is a circuit designed to produce an output when and only when a 1 digit is present in both input channels. This output is fed into an inverting circuit so that an output is given when 1 digits are not present in both channels. This output and the output from the "OR" gate are then fed together to a further "AND" gate so that finally an output pulse is given only when X and Y are non-equivalent.

As shown in Figure 2 the unit 15 comprises valves V1, V2 and V3, diodes D1 to D11 and the associated circuits. The input X having a voltage waveform as shown in Figure 5 (b) representing the binary number 01101001110010 (1 is represented by a negative going pulse) is fed continuously from the selected electrostatic store to the diodes D1 and D3, and the input Y, having a voltage waveform as shown in Figure 5 (c) representing the binary number 01101101100010, is fed continuously from the selected track in the magnetic store to the diodes D2 and D4.

The diodes D1 and D2 connected as shown with the resistor R1 going to a positive potential constitute an "OR" gate, because if the cathode of either diode goes negative the grid of valve V1 is taken negative with it. The output of the cathode follower valve V1 is thus the voltage waveform (X or Y) shown in Figure 5 (f). This output is applied to the anode of diode D9, forming part of the final "AND" gate which will be described later.

The diodes D3 and D4 connected as shown constitute an "AND" gate because the voltage on the grid of valve V3 follows the more positive of the two input voltages X and Y applied to the anodes of diodes D3 and D4 and the voltages on both anodes will have to be negative due to a 1 digit signal in both X and Y to permit the voltage applied to the grid of valve V3 to fall. The voltage applied to the grid of valve V3 is thus as shown in Figure 5 (d). Valve V3 is permitted to conduct only during the first 6 microseconds of each 10 microseconds digit period in the machine operating rhythm by the application to its suppressor grid of a voltage having a waveform shown in Figure 5 (a) and called the positive dash waveform Dh and even then, it can only conduct during this time if a signal input dash pulse, which is negative-going for the first 6 microseconds of a digit period, is not simultaneously applied to the control grid of wave V3. If an input dash pulse is applied to the control grid simultaneously with the positive dash pulse on the suppressor grid the valve current remains reduced and the anode voltage is accordingly high at the locked value of +50 volts due to the action of the diode D5. If, however, an input signal dash pulse is absent in any digit position and the control grid is held accordingly positive, the valve will conduct during the first 6 microseconds of the digit period and a negative going dash pulse will be obtained at the anode. The resulting voltage waveform appearing at the anode of valve V3 is therefore as shown in Figure 5 (e), this valve, therefore, constitutes a "NOT" device and produces an output when X and Y are not both ones, which is the negated output of the "AND" gate comprising the diodes D3 and D4.

This signal is D. C. restored below earth potential by the D. C. coupling to the grid of the cathode follower valve V2, and applied to the anode of the diode D10.

The two signals "(X or Y)" and "not (X and Y)" are now thus applied to the anodes of diodes D9 and D10 which perform the final "AND" function. If a pulse is obtained at the common cathodes of the diodes in this "AND" gate then an indication of non-equivalence is given and the pulse is allowed to trigger the valve V4 of the check trigger circuit 16. Due to the various diode gates through which both signals pass at the separate sources of the applied inputs X and Y the negative pulses applied to the diodes D9 and D10 do not have the same configuration. A voltage having a waveform known as the pause waveform Pa diagram g, Fig. 5, is, therefore, applied to the anode of diode D6. This waveform goes negative for a period in the centre of the dash pulse, it therefore acts as a strobe which only releases the "AND" gate for a defined period in the centre of both of the applied dash pulse inputs. The inputs to D9 and D10 are continuous whatever operation is occurring in the machine for they are connected directly to the read outputs of both the electrostatic and magnetic stores. The gate must, therefore, be rendered non-operative when other operations are in progress. The Ch1 waveform applied to the anode of diode D8 closes the gate except when the Ch digit in the magnetic instruction is 1 when the voltage waveform goes negative from an earth resting level which prevails while the Ch digit is "0." The T1 waveform applied to the anode of D7 closes the gate except during the actual transfer time as determined by the presence of a Present instruction requiring a magnetic transfer in the control system CL. The J waveform applied to the anode of diode D11 enables the checking operations to be controlled by the S/T and G digits and gives rise to the check codes given in the list of magnetic functions.

The check trigger circuit 16 shown in Figure 3 is normally kept in the 0 state in which valve V4 is conducting by a continuous supply of negative re-trigger pips applied to the grid of valve V5 from the re-set unit 22. These trigger pips are generated in a triple diode "AND" gate containing diodes D18, D19 and D20 and to which voltages waveforms called the Wo, To and Co waveform are applied from the waveform generator unit WGU. In the normal state namely, when no magnetic transfer is taking place, the voltages having the Wo and To waveform are continuously negative whereby the voltage having the Co waveform is applied to the grid of the cathode follower valve V9. The Co waveform normally has a negative-going edge at the end of the S1 beat of each bar from which it will be seen that the check trigger circuit is retriggered at the end of such S1 beat in every bar. During a transfer however when either the Wo or To waveform is positive these re-trigger pips are suppressed. The same supply of re-trigger pips is employed on all the magnetic transfer staticisors. During a transfer, therefore, the check trigger circuit will initially be set in the 0 state. In Figure 3 single digit non-equivalence in the gated comparison of inputs X and Y in the check unit which appears from input 30 as a negative pulse on the grid of valve V4 will trigger circuit the trigger into the 1 state with valve V4 cut off. The 1 output of the check trigger is fed from the cathode follower valve V6 to the trigger input of the binary counter through the output 31. Therefore when the check trigger circuit is triggered on the grid of valve V4 the negative edge in the 1 output will trigger the binary counter. Any further non-equivalence in the transfer will have no effect on the check trigger circuit. On completion of the transfer the normal operating rhythm will be resumed and a new bar will commence. The To waveform will go negative though the magnetic transfer staticisors will remain set up until the end of the first scan beat of the new bar. Therefore in the quadruple diode gate comprising diodes D14, D15, D16, D17 attached to the grid of valve V8 the following action will occur. The anode of diode D16 will be negative, the anode of diode D15 will be negative for the check or Ch digit staticisor is still triggered. Then if the check trigger circuit 16 has not been triggered the 0 output attached to the anode of diode D14 will be negative and a P1 pulse will be applied to the grid of valve V8, thereby causing "2" to be added in addition to the normal "1" added to the current instruction line in control. If the check trigger circuit 16 has been triggered however then diode D14 will be held positive and no P1 pulse will pass through the cathode follower valve V8. The output of valve V8 is applied to an adding circuit in the control system CL so that the addition of the extra P1 pulse (of value 2′) is made to the control instruction (C. I.) number. At the end of the S1 beat the magnetic staticisors are reset and all further addition of an extra P1 pulse is prevented.

Figure 4 shows the first stage of the binary counter 18. The unit consists of two valves V11 and V12 which are coupled between anode and control grid to form a trigger as shown. The trigger pulse from the output of the check trigger is applied via terminal 31 to both anodes through the diode D21 and D22 and the state of the trigger is then changed. Initially the counters are all set in the 0 state with the valves such as valve V11 cut-off by the application of a negative going P1 pulse to the grid of the valve such as V11 in each stage of the complete counter. On the first non-check the first stage of the counter is triggered into the 1 state by the negative pip applied to the common anode. The potential on the anode of valve V11 falls consequently and a potential of +300 v. is applied across the neon 18 in the anode circuit and it ignites. At the end of the checking operation there will be no re-trigger pip along the common lead so that the trigger will retain its state. If another checking operation is conducted and a further non-check is indicated then the stage will be changed by the negative pulse applied to the common anodes and the negative edge produced at the anode of valve V12 generates a trigger pulse which is applied via the terminal 34 to the common anode of the following stage in the counter which is similar to the first stage. In this way the counter chain will count a series of non-checks up to 16 as there are four exactly similar stages. If a check occurs then a P1 pulse is released in the check unit and the chain of counters are re-set by the diodes D25 via the terminals 32. The anode of one of the valves is attached as shown in Figure 1 to a cathode follower 19 and the output fed to the stop unit 20. When this stage is triggered then the output level of the cathode follower goes negative and the stop units is triggered and the machine is stopped. By selecting the anodes of the stages 1, 2, 3 or 4 the number of non-checks permissible may be present to 1, 2, 4 or 8. Alternatively the stop unit may be arranged to be operated by a positive going pulse obtained when the valve such as valve V12 is switched off, in this case the number of non-checks permissible is 2, 4, 8 or 16 depending on which stage of the counter arrangements is feeding the stop unit. In Figure 1 the fourth stage of the counter is shown operating the stop unit 20.

What we claim is:

1. In an electronic digital computing machine operating with numbers signalled in the serial mode as electric pulse signal trains and comprising a main data storage means, a computing organ, a subsidiary data storage means and a control system for controlling the operating rhythm of the machine and ordering the necessary transference of numbers and instructions, the provision of checking apparatus which comprises a non-equivalence detecting device for detecting non-equivalence between successive digit signals in two simultaneously applied number-representing pulse signal trains and providing a signal output upon detection of any non-equivalence between any of such successive digit signals, switchable means for connecting said non-equivalence device between transfer channels extending between said main data storage means and said subsidiary data storage means, a trigger circuit connected to said non-equivalence detecting device to be triggered by said signal output indicating non-equivalence by said non-equivalence detecting device, means for resetting said trigger circuit at the end of a checking operation and means for applying an output from said trigger circuit to modify the operation of said control system.

2. In an electronic digital computing machine operating with numbers signalled in the serial mode as electric pulse signal trains and comprising a main data storage means, a computing organ, a subsidiary data storage means, controlled transfer channels between said main data storage means; said subsidiary data storage means and said computing organ, and a control system for controlling the operating rhythm of the machine and ordering the necessary transference of numbers and instructions by way of said transfer channels, the provision of checking apparatus which comprises a non-equivalence detecting device for detecting non-equivalence between each of the successive digit positions of two simultaneously applied number-representing pulse signal trains and providing an output signal for non-equivalence, connections for connecting said non-equivalence detecting device between the transfer channel extending from said main data storage means to said subsidiary data storage means and the transfer channel extending from said subsidiary data storage means and said main data storage means, and means for applying said output signal from said non-equivalence detecting device to said control system to change the order of machine operation.

3. In an electronic digital computing machine operating with numbers signalled in the serial mode as electric pulse signal trains and comprising a main data storage means, a computing organ, a subsidiary data storage means, controlled transfer channels between said main data storage means, said subsidiary data storage means and said computing organ, and a control system for controlling the operating rhythm of the machine and ordering the necessary transference of numbers and instructions by way of said transfer channels, the provision of checking apparatus for checking machine operation which comprises a non-equivalence detecting device for detecting non-equivalence between corresponding digit signals in two simultaneously applied number-representing pulse signal trains and providing a signal output upon detection of any non-equivalence between any of said corresponding digit signals, said device having two pulse train input terminals for receiving the two simultaneous number-representing signal trains and an output terminal for delivering said non-equivalence indicating output signal, a connection between one input terminal of said non-equivalence detecting device and the transfer channel extending from said main data storage means to said subsidiary data storage means, a connection between the other input terminal of said non-equivalence detecting device and the transfer channel extending from said subsidiary data storage means to said main data storage means, a trigger circuit connected to said output terminal of said non-equivalence detecting device to be triggered by said output signal indicating non-equivalence, means for resetting said trigger circuit at the end of a checking operation and means for applying an output from said trigger circuit to modify the operation of said control system to change the order of machine operation.

4. In an electronic digital computing machine comprising a main data storage means, a computing organ, a subsidiary data storage means and a control means for controlling the operating rhythm of the machine and ordering the necessary transference of numbers and instructions, the provision of checking apparatus for checking machine operation which comprises a non-equivalence detecting device for detecting non-equivalence between corresponding digit signals in two simultaneously applied number-representing signals and providing a signal output upon detection of any non-equivalence between any of said corresponding digit signals, means for applying the signal outputs available simultaneously from said main and said subsidiary data storage means to said non-equivalence detecting device counting means connected to said non-equivalence detecting device to register the number of output signals representing detected instances of non-equivalence and means operated from said counting means for stopping the computing operating rhythm of said machine upon the registration of a predetermined number of detected instances of non-equivalence.

5. In an electronic digital computing machine operating with numbers signalled in the serial mode as electric pulse signal trains and comprising a main data storage system having a plurality of separate storage locations for each of a plurality of number words and machine instruction words, an arithmetical organ for performing a computing operation with serial mode number word signals derived from said main storage system, a control system for controlling the operating rhythm of the machine and for ordering the requisite selection and transference of words between said main storage means and said arithmetical organ and a subsidiary data store having a plurality of separate storage locations for holding additional number word and instruction word data, the provision of means for effecting checking of partial answers obtained during operation of the machine, said checking means comprising a non-equivalence detecting circuit having two input terminals for the respective reception of two dynamic signal pulse trains to be compared and an output terminal at which an output signal is provided in the event of detected non-equivalence, circuit means for connecting one of said input terminals of said non-equivalence detecting means to the signal output of said main data storage system, second circuit means for connecting the other of said input terminals of said non-equivalence detecting circuit to the output terminal of said subsidiary data store, an electronic trigger circuit having its triggering input terminal supplied with the output signal from said non-equivalence detecting circuit, means for resetting said trigger circuit after the end of a checking operation and indicator means connected to said trigger circuit for energisation by the latter when in its triggered condition.

6. In an electronic binary digital computing machine operating in the serial mode with numbers represented by electric pulse signal trains and comprising a main cathode ray tube storage system having a plurality of separate storage locations for a plurality of number words and machine instruction words, an arithmetical organ for performing a computing operation with dynamic form number signals derived from said main storage system, a control system for controlling the operating rhythm of the machine and for ordering the requisite selection and transference of words between said main storage system and said arithmetical organ and a subsidiary magnetic drum store operating in synchronism with said cathode ray tube main storage system and having a plurality of separate recording tracks each holding the equivalent of one complete filling of one main store cathode ray tube, the provision of means for effecting checking the machine operation said checking means comprising a non-equivalence detecting circuit having two input terminals for the respective application of two simultaneously occurring pulse signal trains and an output terminal at which an output signal is provided in the event of detected non-equivalence between said pulse trains, circuit means for connecting one of said input terminals to the signal read output terminal of said main storage means, second circuit means for connecting the other of the input terminals to the read output terminal of said subsidiary storage means, means for rendering said non-equivalence detecting circuit inoperative by said control system in the absence of an instruction to effect checking, a trigger circuit having its triggering input terminal supplied with the output from said non-equivalence detecting circuit, so as to be triggered by the output signal from said non-equivalence detecting circuit, means for resetting said trigger circuit after the end of a checking operation by a signal derived through said control means, a source of signals for modifying the operation of said control system, circuit means including a controllable gate between said source and said control system and means for applying an output from said trigger circuit as a control medium for said gate.

7. In an electronic binary digital computing machine operating in the serial mode with numbers represented by electric pulse signal trains and comprising a main cathode ray tube store having a plurality of separate data storage locations for a plurality of number words and machine instruction words, an arithmetical organ for performing a computing operation with dynamic form number signals derived from said main store, a control system for controlling the operating rhythm of the machine and for ordering the requisite selection and transference of words between said main store and said arithmetical organ, a subsidiary magnetic drum store operating in synchronism with said main cathode ray tube store and having a plurality of separate recording tracks each having a storage capacity equal to one complete filling of two cathode ray tubes of said main store, a transfer channel from said main store to said subsidiary store, a further transfer channel from said subsidiary store to said main store and means in said control system for effecting transfer of stored data in either direction between said stores the provision of means for effecting checking the operation of the machine, said checking means comprising a non-equivalence detecting circuit having two input terminals for the respective application of two simultaneously occurring pulse signal trains and an output terminal at which an output signal is provided in the event of detected non-equivalence between said pulse trains, first circuit means for connecting one of said input terminals to the transfer channel from said subsidiary store to said main store second circuit means for connecting the other of said input terminals to the output of said main store, a trigger circuit having its triggering input terminal connected to said output terminal of said non-equivalence detecting circuit so as to be triggered by the output signal from said output terminal, means for resetting said trigger circuit after the end of a checking operation by a signal derived through said control system a source of modifying signals for modifying the operation of said control system from a first condition where it produces a repetition of a preceding computing step to a second condition where it proceeds with a new computation step, circuit means including a controlled gate between said source and said control system and means for applying an output from said trigger circuit as a controlling medium for said gate whereby said gate is opened to allow passage of said modifying signal only if said trigger circuit remains untriggered at the completion of said checking operation.

8. In an electronic binary digital computing machine operating in the serial mode with numbers represented by electric pulse signal trains and comprising main storage means having a plurality of separate and immediately accessible data storage locations for a plurality of number word and machine instruction word items, an arithmetical organ for performing computing operations with number-representing pulse signal trains applied thereto, a control system comprising a first number store for retaining a control instruction number, means for altering said control instruction number by a first predetermined amount during each computing cycle of the machine operation, means for utilising said altered control instruction number to select a present instruction number from said main storage means and means for utilising said selected present instruction number to select a number item from said main storage means and to control the performance of the required computing operation therewith, a subsidiary store having a plurality of separate storage locations for further number word and instruction word data items required in the computation and controllable circuit means for interconnecting said main storage means with said subsidiary storage means to permit transference of data items in either direction between said respective storage means under the control of said control system, the provision of checking arrangements which comprise a non-equivalence detecting circuit having two input terminals for the reception of the respective number-representing pulse signal trains to be compared for equivalence, and an output terminal at which an output signal is provided in the event of a detected non-equivalence, first circuit means connecting one of said input terminals with the output of said main store, second circuit means connecting the other of said input terminals to the output from said subsidiary store a trigger circuit having its triggering input connected to the output terminal of said non-equivalence detecting circuit so as to be triggered by the output signal from said output terminal of said non-equivalence detecting circuit, control means for altering said control instruction number in said control system by a second and different predetermined amount, a control connection between said altering means and said trigger circuit whereby the presence of a non-equivalence between the two applied input signals to said non-equivalence circuit causes change of the amount of alteration made to said control number of said control system and a consequent change of order of the present instruction series obeyed by the machine.

9. In an electronic digital computing machine operating with numbers signalled in the serial mode as electric pulse signal trains and comprising a main data store having a plurality of separate and immediately accessible storage locations for both number items and machine instruction items, a computing organ for performing mathematical operations with number-representing pulse signal trains applied thereto, a subsidiary store having a plurality of storage locations for both number items and machine instruction items, transfer channels between said main store, said arithmetical organ and said subsidiary store, said transfer channels including control gates for inhibiting transfer as required and a control system for governing the operation of the machine in a step by step manner comprising a series of major cycles each of which is devoted to effecting one computing step of the total computation, said control system including a first number store means for holding a control number, means for altering said stored control number by a first predetermined digit value during each major cycle, means for deriving a control signal from said control number for selecting a particular address location in said main store which holds a present instruction word, means for obtaining and utilising said present instruction word to select a required number at a different address in said main store and to control said gates in said transfer channels to route the selected number as required for the current computation step, the provision of checking arrangements which comprise a non-equivalence detecting circuit having two input terminals for the application of two pulse train input signals to be compared for equivalence and an output terminal at which an output signal is provided in the event of detected non-equivalence, a connection between one input terminal of said non-equivalence detecting circuit and the signal output from said main store, a connection between the other input terminal of said non-equivalence detecting circuit to the signal output of said subsidiary store, a trigger circuit having its triggering input connected to said non-equivalence detecting circuit output terminal and an output terminal at which an output signal is provided when said trigger circuit is in its triggered state, a binary counting device having an input terminal connected to said trigger circuit output terminal to count the number of times said trigger circuit is triggered and an output terminal at which a count output signal is provided when the input pulses counted by said device reaches a predetermined number, normally inoperative means for altering said stored control number in said control system by a second and different predetermined digit value and means connected to said output terminal of said trigger circuit and energised by an output from said trigger circuit for changing the predetermined digit value by which said control instruction is altered from one value to another upon triggering of said trigger circuit by a detected non-equivalence.

10. The invention as claimed in claim 5 wherein said non-equivalence detecting circuit comprises an "AND" gate supplied with the respective input signals, an "OR" gate also supplied with said input signals, means for negating the output from said "AND" gate and a further "AND" gate supplied with said negated output and the output from said "OR" gate, the output from such further "AND" gate forming said output terminal which is energised in the event of detected non-equivalence.

11. In an electronic digital computing machine comprising a main data storage means, a computing organ, a subsidiary data storage means, controlled transfer channels between said main data storage means, said subsidiary data storage means and said computing organ, and a control system for controlling the operating rhythm of the machine and ordering the necessary transference of numbers and instructions by way of said transfer channels to perform a computation followed by a check upon the answer obtained, the provision of checking apparatus for checking machine operation which comprises a non-equivalence detecting device for detecting non-equivalence between corresponding digit signals in two simultaneously applied number-representing signals and providing a signal output upon detection of any non-equivalence between any of said corresponding digit signals, said device having two input terminals and an output terminal, a connection between one input terminal of said non-equivalence detecting device and the transfer channel extending from said main data storage means to said subsidiary data storage means, a connection between the other input terminal of said non-equivalence detecting device and the transfer channel extending from said subsidiary data storage means to said main data storage means, a trigger circuit connected to said output terminal of said non-equivalence detecting device to be triggered by said output signal indicating non-equivalence, means for resetting said trigger circuit at the end of a checking operation and means for applying an output from said trigger circuit to modify the operation of said control system to repeat the performance of said computation and said check operation.

12. In an electronic digital computing machine comprising a main data storage means, a computing organ, a subsidiary data storage means and a control system for controlling the operating rhythm of the machine and ordering the necessary transference of numbers and instructions to perform a computation, the provision of checking apparatus for checking machine operation which comprises a non-equivalence detecting device for detecting non-equivalence between corresponding digit signals in two simultaneously applied number-representing signals and providing a signal output upon detection of any non-equivalence between any of said corresponding digit signals, means for applying the signal outputs available simultaneously from said main and said subsidiary data storage means to said non-equivalence detecting device, means operated by said output signal from said non-equivalence detecting device for modifying the operation of said control system to cause a repeat performance of said computation when non-equivalence is detected by said non-equivalence detecting device, counting means connected to said non-equivalence detecting device to register the number of detected instances of non-equivalence and means operated from said counting means for stopping the computing operating rhythm of said machine upon the registration of a predetermined number of detected instances of non-equivalence.

13. In an electronic digital computing machine comprising a main data storage means, a computing organ, a subsidiary data storage means and a control system for controlling the operating rhythm of the machine and ordering the necessary transference of numbers and instructions to perform a computation, the provision of checking apparatus for checking machine operation which comprises a non-equivalence detecting device for detecting non-equivalence between corresponding digit signals in two simultaneously applied number-representing signals and providing a signal output upon detection of any non-equivalence between any of said corresponding digit signals, means for applying the signal outputs available simultaneously from said main and said subsidiary data storage means to said non-equivalence detecting device, control transfer means operated by said output signal from said non-equivalence detecting device for modifying the operation of said control system to cause the last-obtained answer signal to be recorded in said subsidiary storage means and a repeat performance of said computation when non-equivalence is detected by said non-equivalence device, counting means connected to said non-equivalence detecting device to register the number of detected instances of non-equivalence and means operated from said counting means for stopping the computing operating rhythm of said machine upon the registration of a predetermined number of detected instances of non-equivalence.

References Cited in the file of this patent

UNITED STATES PATENTS

| | | |
|---|---|---|
| 1,944,665 | Oldenboom | Jan. 23, 1934 |
| 2,230,673 | Blakely | Feb. 4, 1941 |
| 2,484,081 | Dickinson | Oct. 11, 1949 |
| 2,604,262 | Phelps et al. | July 22, 1952 |
| 2,636,672 | Hamilton et al. | Apr. 28, 1953 |